3,242,162
INDOLYL ALIPHATIC ACIDS
Lewis H. Sarett, Princeton, and Tsung-Ying Shen, Westfield, N.J., assignors to Merck & Co., Inc., Rahway, N.J., a corporation of New Jersey
No Drawing. Original application Mar. 13, 1961, Ser. No. 94,995. Divided and this application Oct. 21, 1964, Ser. No. 405,593
3 Claims. (Cl. 260—211)

This application is a divisional application of our copending application, Serial No. 94,995, filed March 13, 1961, now U.S. Patent No. 3,196,162, which in turn is a continuation-in-part of our now abandoned application, Serial No. 837,774, filed September 3, 1959.

This invention relates to new chemical compounds. More particularly, it relates to a new class of compounds of the indole family. Still more particularly, it is concerned with new α-(3-indolyl)-lower aliphatic acids. Still more specifically, it is concerned with α-(3-indolyl)-lower aliphatic acids having a functionally substituted benzyl radical attached to the nitrogen atom of the indole ring, and with salts and esters of such compounds. It relates also to the synthesis of such substances.

For several years the management of arthritic and related conditions has been carried out with steroids such as cortisone, prednisone and the like. These substances are efficacious but suffer, in varying degrees, the disadvantage of causing certain undesirable side-effects. The non-steroidal anti-inflammatory agents known heretofore have not been entirely satisfactory since they also are prone to cause undesirable side-effects in many instances. Consequently, there has been considerable research toward the discovery of active anti-inflammatory agents which lacked such disadvantages.

In accordance with the present invention, it has been found that certain α-(3-indolyl)-lower aliphatic acids possess anti-inflammatory activity and are effective in inhibiting or preventing formation of granuloma tissue. Certain of the compounds of the invention demonstrate a high degree of such activity and are of importance in the treatment of arthritic and dermatological disorders and of like conditions which respond to treatment with anti-inflammatory agents. Certain of them in addition exhibit strong antipyretic action.

The new α-(3-indolyl)-lower aliphatic acids described herein are also useful as sun-screening agents, and as intermediates in syntheses of substituted tryptamines and tryptamine derivatives which counteract the pressor activity of serotonin. They are also useful as intermediates in syntheses of derivatives and analogs of reserpine.

It is an object of this invention, therefore, to provide a new series of α-(3-indolyl)-aliphatic acids. It is a further object to provide α-(3-indolyl)-lower aliphatic acids having a functionally substituted benzyl radical at the N–1 position of the indole ring system. It is a still further object to provide salts and esters of such acids. An additional object is provision of syntheses of these new compounds. Other objects will be apparent from the ensuing discussion of our invention.

The new compounds of this invention have the general structural formula

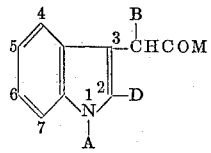

where A is a functionally substituted benzyl radical, B is hydrogen, a lower alkyl or a lower alkenyl radical, and M is hydroxy, hydrocarbonoxy, —O metal, —NH$_2$. The six-membered ring of the indole nucleus may be substituted in the 5- and/or 6-positions, and in the preferred compounds D in the above formula is hydrogen or a hydrocarbon radical containing less than nine carbon atoms. These substances may be considered as functionally substituted indoles. Alternatively, and preferably, they are described as α-(3-indolyl)-lower aliphatic acids having a functionally substituted benzyl radical at the 1-position (i.e., the nitrogen atom) of the indole nucleus. All of the compounds of our discovery have both the functionally substituted benzyl radical at the 1-position and the lower aliphatic acid residue at the 3-position of the indole nucleus. By a functional substituent we mean one other than hydrogen or hydrocarbon. The nature of the substituents at the 5- and/or 6-positions will be fully discussed hereinafter.

In its more narrow aspects, our invention embraces indolyl aliphatic acids having the structural formula

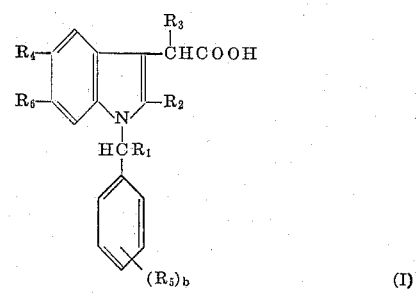

and the salts, esters and amides of such acids.

The α-(3-indolyl)-aliphatic acids described herein are lower aliphatic acids such as α-(3-indolyl) derivatives of acetic, propionic, valeric, β-halo-propionic, acrylic, 4-pentenoic acid and like acids. Thus, R$_3$ is preferably hydrogen or a lower alkyl or lower alkenyl group, e.g., methyl, propyl, methylene and the like. However, if desired, R$_3$ may be part of a cycloalkyl substituent such as a cyclopropyl ring.

One of the hydrogen atoms in the methylene group of the N–1 benzyl radical may, if desired, be replaced with a lower alkyl or lower alkenyl group such as a methyl, ethyl, propyl, allyl or vinyl radical.

The substituent at the 2-position of the indole ring nucleus in the compounds of the invention may be hydrogen or a hydrocarbon radical. In the preferred compounds, R$_2$ is a hydrocarbon group having less than nine carbon atoms. This may be a lower alkyl radical such as a methyl, ethyl, propyl, butyl, isopropyl, amyl or hexyl group, a cycloaliphatic residue such as cyclohexyl, an unsaturated aliphatic group such as allyl or vinyl, an aryl or aralkyl radical such as phenyl, benzyl or phenethyl. Alternatively, R$_2$ may represent a substituted hydrocarbon of the type represented by haloalkyl, hydroxyalkyl, halophenyl, alkoxyphenyl, benzylthioalkyl and the like. Specific examples of such substituted hydrocarbon radicals are p-methoxyphenyl, p-chlorophenyl, benzylmercaptomethyl, fluoromethyl and hydroxymethyl.

The indole ring may be substituted with a group other than hydrogen at the 5- and/or 6-positions. In accordance with one preferred aspect of the invention, there is at the 5-position a lower alkoxy group such as methoxy, propoxy, ethoxy, isopropoxy or t-butoxy or a lower alkyl radical such as methyl, ethyl, propyl, t-butyl and the like. However, the R$_4$ and R$_6$ substituents of our new compounds are not limited to such groups. At the 5- and/or 6-positions there may be present an aryl, aryloxy, hydroxy, halo, nitro, amino, lower alkylamino, lower alkanoylamino, amine oxide, mercapto, alkylthio, arylthio, aralkylthio, sulfoxide, sulfamyl, cyano, haloalkyl, lower alkanoyl, carboxy, carbalkoxy, thioacetal, ketimine, lower alkenyl, haloalkanoyl, thioester or aldehydo grouping. Typical examples of specific substituents are phenyl, tolyl, phenoxy, allyloxy, phenylthio, benzylthio, methylthio, ethylthio, chloro, fluoro, trifluoromethyl, chloroethyl, dimethylamino, ethylamino, benzylthiomethyl, acetyl, propionyl, and chloroacetyl groups.

An important feature of the new compounds of this invention is that at least one functional group is attached to the aromatic ring of the N–1 benzyl radical. Thus, in the benzyl radical, $R_5$ in Formula I is a substituent other than hydrogen or hydrocarbon, and $b$ is a positive whole number less than four. It may be hydroxy or an etherified hydroxy (hydrocarbonoxy) group such as a lower alkoxy, e.g., methoxy, ethoxy, isopropoxy, allyloxy, propoxy, an aryloxy or aralkoxy group, e.g., phenoxy, benzyloxy, halobenzyloxy, lower alkoxybenzyloxy and the like. It may be a nitro radical, a halogen such as chlorine, bromine, iodine or fluorine, an amino group or a substituted amino group, representative examples of which that might be mentioned are acylamino, amine oxide, ketimines, urethanes, lower alkylamino, lower dialkylamino, amidine, acylated amidines, hydrazine or a substituted hydrazine, alkoxyamines and sulfonated amines. Further, $R_5$ may be a mercapto or a substituted mercapto radical of the type exemplified by alkylthio groups such as methylthio, ethylthio, and propylthio and arylthio or aralkylthio groups, e.g., benzylthio and phenylthio. The N–1 benzyl radical may, if desired, be haloalkylated, as with a trifluoromethyl, trifluoroethyl, perfluoroethyl, β-chloroethyl or like substituent, acylated as with acetyl, propionyl, benzoyl, phenylacetyl, trifluoroacetyl and like acyl groups, or it may contain a haloalkoxy or haloalkylthio substituent. In addition, our invention embraces compounds wherein $R_5$ is a sulfamyl, benzylthiomethyl, cyano, sulfonamido or dialkylsulfonamido radical. Further, $R_5$ may represent a carboxy substituent, or a derivative thereof, such as an alkali metal salt or a lower alkyl ester of the carboxy radical, an aldehyde, azide, amide, hydrazide and the like, or an aldehyde derivative of the type represented by acetals or thioacetals.

As structural Formula I above indicates, the benzyl radical of our compounds contains at least one functional substituent of the type discussed hereinabove, and may contain as many as three such substituents. When the aromatic ring is poly-substituted, the substituents may be the same or different, the only limitation being that imposed by the methods available for introducing various types of functional groupings into the benzyl moiety. For instance, the N–1 substituent may be 2,4-dichlorobenzyl, 3,4-dihalobenzyl, 3,4-dimethoxybenzyl, 2-methyl-4,5-dichlorobenzyl and the like. It should be stressed that functional groups other than those specifically referred to above may be present in the benzyl radical in the compounds of our invention, said invention being one that contemplates functional groups broadly in this portion of the indole molecule.

Included within this invention, in addition to the α-(1-functionally substituted benzyl-3-indolyl)-lower aliphatic acids themselves, are salts and esters of the free acids, and the amides thereof. As is discussed more fully hereinbelow, the esters are important intermediates in one synthesis of the free acids, and in some instances possess the physiological activity of the acids. Lower alkyl esters such as the methyl, ethyl, propyl or t-butyl compounds are preferred although others such as the benzyl, p-halobenzyl, naphthyl, phenyl and like esters are satisfactory and may be employed if desired, as may be heterocyclic esters such as the furoate and pyrazinoate or cyclic esters such as the cyclohexoate.

The salts of these α-(indolyl)-lower aliphatic acids represent an additional, and in some cases a preferred, aspect of the invention. Many of the salts are more water soluble than the corresponding acids and esters and in many instances are more suitable physiologically than the acids. Examples of salts within the purview of the invention are those of alkali salts such as sodium, potassium, lithium, alkaline earth metals such as the barium and calcium salts, the aluminum or magnesium salts, those of organic amines such as glucosamine, morpholine, choline or diethylamine and salts of heavy metals such as zinc and iron. When such compounds are to be used as anti-inflammatory or antipyretic agents, or administered to animals for other purposes, it is, of course, necessary to employ a non-toxic salt. The salts are conveniently prepared in pure form from the free acid by treating the acid in solution with a base such as an alkali or alkaline earth metal hydroxide, a sulfate such as aluminum sulfate, or by exposing the acid to an anion exchange resin on the salt cycle.

In addition, the acids of Formula I above may be converted to the corresponding amides by reaction with urea. Alternatively, amides may be obtained by reacting the acid halide with ammonia or an alkylamine. When alkylamines are used, an N-alkylamide will be formed.

Representative of the new α-(1-substituted benzyl-3-indolyl)-lower aliphatic acid compounds within the scope of our invention are the following:

α-(1-p-fluorobenzyl-2-methyl-5-methoxy-3-indolyl)-propionic acid,

α-(1-o-chlorobenzyl-2-methyl-5-methoxy-3-indolyl)-propionic acid,

α-(1-m,p-dichlorobenzyl-2-methyl-5-methoxy-3-indolyl)-propionic acid,

α-(1-p-methoxybenzyl-2-methyl-5-methoxy-3-indolyl)-propionic acid,

α-(1-p-aminobenzyl-2-methyl-5-methoxy-3-indolyl)-propionic acid,

α-(1-p-trifluoromethylbenzyl-2-methyl-5-methoxy-3-indolyl)-propionic acid,

α-(1-p-chlorobenzyl-2-methyl-5-methoxy-3-indolyl)-propionic acid,

α-(1-p-chlorobenzyl-2-methyl-5-trifluoromethyl-3-indolyl)-propionic acid,

α-(1-p-chlorobenzyl-2,5-dimethyl-3-indolyl)-propionic acid,

α-(1-p-chlorobenzyl-2,5-dimethyl-3-indolyl)-butyric acid,

α-(1-o-bromobenzyl-2,5-dimethyl-3-indolyl)-butyric acid,

α-(1-p-acetylaminobenzyl-2-methyl-5-ethoxy-3-indolyl)-acetic acid,

α-(1-p-benzyloxybenzyl-2-methyl-5-butoxy-3-indolyl)-acetic acid,

α-(1-m-mercaptobenzyl-2,5-dipropyl-3-indolyl)-propionic acid,

α-(1-p-nitrobenzyl-2-allyl-5-methoxy-3-indolyl)-propionic acid,

α-(1-p-nitrobenzyl-2-ethyl-5-methoxy-3-indolyl)-acetic acid,

α-(1-p-trifluoroacetylbenzyl-2-methyl-5-methoxy-3-indolyl)-propionic acid,

α-(1-p-methoxybenzyl-2-methyl-5-chloro-3-indolyl)-acetic acid,

α-(1-p-halobenzyl-2-methyl-5-benzyloxy-3-indolyl)-acetic acid,

α-(1-p-halobenzyl-2-methyl-5-sulfamyl-3-indolyl)-propionic acid,

α-(1-p-halobenzyl-2-phenyl-5-phenylthio-3-indolyl)-acetic acid,

α-(1-p-chlorobenzyl-2-phenethyl-4-carboxy-3-indolyl)-propionic acid,

α-(1-p-ethoxybenzyl-2-methyl-5,6-diacetoxy-3-indolyl)-propionic acid,

α-(1-p-methoxybenzyl-2-methyl-6-trifluoromethyl-3-indolyl)-propionic acid,

α-(1-p-nitrobenzyl-2-propyl-5-mercapto-3-indolyl)-propionic acid,

α-(1-p-aminobenzyl-2-methyl-5-t-butyl-3-indolyl)-propionic acid,

α-(1-p-fluorobenzyl-2-methyl-5-methylthio-3-indolyl)-propionic acid,

α-(1-p-chlorobenzyl-2-methyl-5-trifluoroacetyl-3-indolyl)-propionic acid,

α-(1-p-hydroxybenzyl-2,5-dimethyl-3-indolyl)-propionic acid,
α-(1-p-fluorobenzyl-2-methyl-5-phenoxy-3-indolyl)-propionic acid,
α-(1-p-carboxybenzyl-2-methyl-5-ethoxy-3-indolyl)-acetic acid,
α-(1-p-dimethylaminobenzyl-2-ethyl-5-benzyloxy-3-indolyl)-acetic acid,
α-(1-p-methoxybenzyl-5-methoxy-3-indolyl)-acetic acid,
α-(1-p-chlorobenzyl-2-methyl-3-indolyl)-propionic acid,
α-(1-p-methylthiobenzyl-2-methyl-5-methoxy-3-indolyl)-propionic acid,
α-[1,5-bis-(p-benzylthiomethyl)-2-methyl-3-indolyl]-acetic acid,
α-(1-p-methylthiobenzyl-2-methyl-5-methoxy-3-indolyl)-propionamide,
α-(1-p-fluorobenzyl-2-fluoromethyl-5-methoxy-3-indolyl)-acetamide,
α-[1-(p-methylthiobenzyl)-2-methyl-5-(p-methoxyphenyl)-3-indolyl]-propionic acid,
α-(1-p-chlorobenzyl-2-hydroxymethyl-5-phenyl-3-indolyl)-acetic acid,
α-(1-p-aminobenzyl-5,6-benz-3-indolyl)-propionic acid,
α-(1-p-mercaptobenzyl-2-methyl-5-dimethylsulfamyl-3-indolyl)-acetic acid and
α-(1-p-phenylthiobenzyl-2-phenyl-5-bis-methylthiomethyl-3-indolyl)-propionic acid.

The salts, esters and amides of the above-mentioned free acids may be obtained by appropriate treatment of the acids.

The α-(1-functionally substituted benzyl-3-indolyl)-lower aliphatic acids described herein may be synthesized by various methods, the method of choice in any particular instance depending to a large extent on the nature of $R_2$, $R_4$ and $R_6$ desired in the final product. According to one process, there is first prepared an α-(3-indolyl)-aliphatic acid, or an ester thereof, having the desired substituents at the 2, 5 and 6 positions of the indole nucleus, and this substance is then aralkylated to produce the corresponding α-(1-functionally substituted benzyl-3-indolyl)-lower aliphatic acid or ester. When an ester is employed, it is readily saponified to the free acid with a base such as an alkali metal hydroxide or carbonate.

The aralkylation is conducted by intimately contacting the indolyl aliphatic acid or ester thereof with the functionally substituted benzyl ester of a strong inorganic acid or of an organic sulfonic acid in the presence of a strongly basic condensing agent such as sodium hydride, potassium hydride, sodamide, an alkyl lithium or an alkali metal alkoxide, in a suitable solvent medium. The metallo derivative of the indole reactant forms first, and this in turn reacts with the functionally substituted ester. Suitable benzyl esters are the chlorides, bromides, benzenesulfonates, p-toluenesulfonates or methanesulfonates, with a functionally substituted benzyl chloride or bromide being preferred. The reaction medium is not unduly critical, and dimethylformamide, dimethylformamide-benzene, aromatic hydrocarbons such as benzene, toluene or xylene, and lower alkanols such as methanol, ethanol, t-butanol, isopropanol, tetrahydrofuran, diphenyl ether and nitrobenzene are representative of satisfactory solvent media that may be employed. When an indolyl aliphatic acid ester is one of the reactants, it is preferred to employ essentially equimolar amounts of the ester and alkaline condensing agent, and a slight molar excess of the functionally substituted benzyl halide. However, in those cases where the free acid is aralkylated, we use two moles of condensing agent per mole of indolyl acid since an acid salt is formed in the reaction mixture.

The temperature at which the aralkylation is conducted is not critical. It is convenient to carry out the process at about room temperature, under which condition it is ordinarily substantially complete in about 1 hour. Longer reaction times are not harmful and may be used if desired.

This aralkylation reaction may be pictured structurally in the following manner:

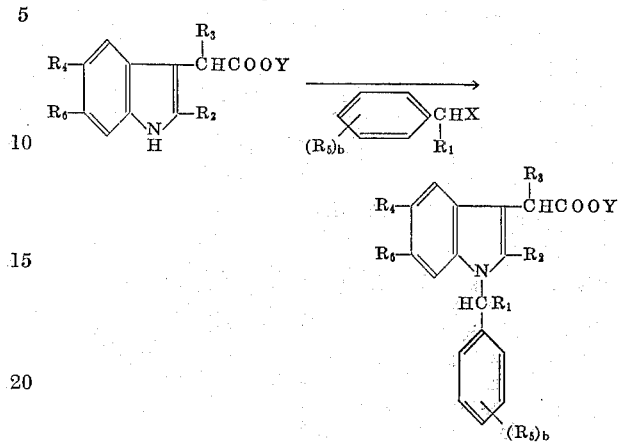

wherein $R_1$, $R_2$, $R_3$, $R_4$, $R_5$, $R_6$ and $b$ are as previously defined, Y is hydrogen or lower alkyl, and X is halogen. When Y is hydrogen, a metal salt is formed under the reaction conditions.

When it is desired to employ this synthesis for making substances wherein the substituents $R_4$, $R_5$ or $R_6$ are basic radicals that would interfere with the aralkylation step, it is preferred to elaborate such a substituent following the aralkylation. Thus, in synthesizing an α-(1-aminobenzyl-3-indolyl)-lower aliphatic acid, it is advantageous to react the indolyl aliphatic acid with α-nitrobenzyl halide, and catalytically reduce the resulting α-(1-nitrobenzyl-3-indolyl)-aliphatic acid to the corresponding amino compound.

Thus, to produce a compound such as α-(1-p-aminobenzyl - 2 - loweralkyl - 5 - hydrocarbonoxy - 3 - indolyl)-propionic acid, p-nitrobenzyl chloride is reacted with an α - (2-loweralkyl-5-hydrocarbonoxy-3-indolyl)-propionic acid ester, and the resulting α-(1-p-nitrobenzyl-2-loweralkyl - 5 - hydrocarbonoxy-3-indolyl)-propionic acid ester thus formed is catalytically reduced using a catalyst such as platinum or palladium on charcoal to the corresponding p-aminobenzyl compound. This latter substance may be hydrolyzed to the free acid by treatment with a mineral acid, or may be further reacted to derivatize the primary amino group, and the resulting compounds then converted to the free aliphatic acid. Thus, an ester of α-(1-p-aminobenzyl - 2 - loweralkyl - 5 - hydrocarbonoxy-3-indolyl)-propionic acid may be reacted with an acylating agent such as acetyl chloride to form α-(1-p-acetylaminobenzyl-2 - loweralkyl-5-methoxy-3-indolyl)-propionic acid ester; with dimethylsulfate in the presence of base to give the corresponding p - N,N - dimethylaminobenzyl compound; with sulfonyl halide to produce the ester of α-(1-p-sulfonamidobenzyl - 2 - loweralkyl - 5 - methoxy - 3 - indolyl)-propionic acid; or with potassium isocyanate to give the urea derivative. All of these esters are readily converted to the free acids. The α-(1-p-N,N-dimethylaminobenzyl-2-loweralkyl - 5 - methoxy-3-indolyl)-propionic acid prepared in this manner can be treated with hydrogen peroxide in acetic acid to form the corresponding N-oxide.

Similarly, those compounds wherein the functional group in the N-benzyl substituent is a derivative of a carboxy radical are conveniently prepared from the α-(1-carboxybenzyl-3-indolyl)-aliphatic acid ester. For example, lower alkyl α - (1 - p - carboxybenzyl-2-methyl-5-methoxy-3-indolyl)-propionate is produced by reacting together a p-carbobenzyloxybenzyl chloride and a lower alkyl α - (2 - methyl-5-methoxy-3-indolyl)-propionate to form lower alkyl α-(1-p-carbobenzyloxybenzyl-2-methyl-5-methoxy-3-indolyl)-propionate which is treated with hydrogen in the presence of a platinum catalyst to give the desired p-carboxybenzyl compound. This latter material having the formula

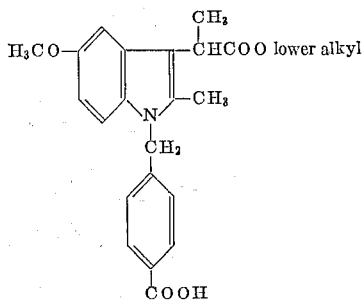

may be reacted with thionyl halide to form the p-haloformylbenzyl derivative which may in turn be treated with ammonia to produce lower alkyl α-(1-p-carboxamidobenzyl-2-methyl-5-methoxy-3-indolyl) - propionate, with hydrazine to give lower alkyl α-(1-p-hydrazidobenzyl-2-methyl-5-methoxy-3-indolyl)-propionate, with hydroxylamine to form lower alkyl α-(1-p-hydroxamobenzyl - 2 - methyl-5-methoxy-3-indolyl)-propionate, or with lithium (tri-t-butoxy) aluminum hydride to produce lower alkyl α - (1-p-aldehydobenzyl-2-methyl-5-methoxy-3-indolyl)-propionate. All of these lower alkyl esters may be saponified to the free propionic acids on treatment with an alkali metal hydroxide under mild conditions.

The indolyl aliphatic acids employed as starting material in the process discussed above, and having the formula

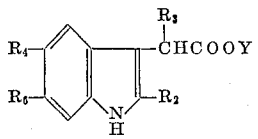

may be obtained in various ways. When $R_2$ is hydrogen, methyl, aryl or aralkyl it is preferred to form such compounds by reacting together an appropriately substituted phenylhydrazine (II) and a compound of Formula III to form an intermediate phenylhydrazone which cyclizes under the reaction conditions to the indole compound

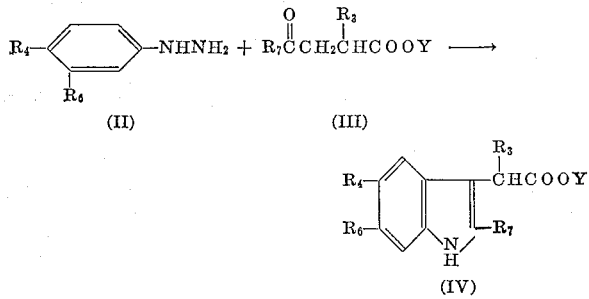

where $R_3$, $R_4$, $R_6$ and Y are as above, and $R_7$ is hydrogen, methyl, aryl or aralkyl. The reaction is normally carried out in a lower alkanol such as methanol, ethanol, isopropanol or butanol containing an acid such as hydrochloric, hydrobromic, sulfuric or acetic acid. The acid serves as a catalyst in the condensation and ring-closure reactions leading to the indole Compound IV. When Compound III is an ester, the nature of the ester is not critical, although it is preferred to utilize a lower alkyl ester, e.g., the methyl, ethyl, propyl, isobutyl or isopropyl compound. To avoid the possibility of transesterification the alcohol used as the solvent medium is preferably the same as the alcohol moiety of the ester. When $R_7$ is hydrogen, it is convenient to employ the aldehyde in the form of an acetal, e.g., methyl γ,γ-dimethoxy butyrate. An acid addition salt of the β-methoxyphenylhydrazine reactant, for example, the hydrochloride, is normally preferred over the free base for practical reasons, although such salts and the base are equivalent in the reaction itself.

Formation of the α-(3-indolyl)-aliphatic acid, or ester thereof, is brought about at elevated temperatures, good results being obtained by refluxing the reaction mixture for at least about 15 minutes. Longer reaction times are not harmful and may be used if desired. The desired compound is recovered from the reaction mixture and purified by techniques such as solvent extraction, chromatography and/or distillation. Since the esters of Formula IV are generally low melting solids, they are conveniently purified by distillation under reduced pressure, and may be saponified if desired by treatment with an alkali metal hydroxide.

The substituted phenylhydrazines employed as one of the starting materials in this synthesis are prepared by known methods. One convenient method is via diazotization of the appropriately substituted aniline to give the diazo compound, treatment of the latter with stannous chloride to form a tin complex, and decomposition of this complex to the phenylhydrazine with sodium hydroxide.

Alternatively, it is possible to first produce an indole of the formula

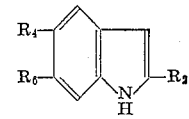

(V)

where $R_2$, $R_4$ and $R_6$ have the same meaning as set forth previously, and subsequently introduce the carboxylic acid residue at the 3-position, either before or after the N–1 aralkylation step discussed above. This is accomplished by treating the indole of Formula V under Mannich reaction conditions with formaldehydedialkylamine to produce a substituted gramine, subsequently reacting this latter compound with an alkali metal cyanide in a lower alkanol, and finally hydrolyzing with a strong base such as sodium or potassium hydroxide.

While this method of introducing the aliphatic acid residue at the 3-position after elaboration of the indole ring is, of course, generally applicable to compounds having the structure shown above, it is particularly useful for making compounds of this invention wherein $R_2$ is an alkyl radical other than methyl, such as the 2-ethyl, 2-propyl, 2-allyl and like substances.

Compounds of Formula V are readily prepared following the procedures set forth in columns 2 and 3 of U.S. Patent No. 2,825,734, products where $R_4$ and/or $R_6$ represent acyloxy, halo, cyano, carboxy, carbalkoxy, alkyl, aryl, aralkyl, nitro or hydrocarbonoxy being prepared via the synthesis beginning from a substituted 2-nitrobenzaldehyde or 2-nitrotoluene.

According to a further aspect of this invention, there are provided novel α-(1-functionally substituted benzyl-2,3-dihydro-3-indolyl)-lower aliphatic acids having the general formula

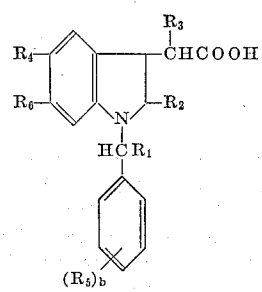

where $R_1$, $R_2$, $R_3$, $R_4$, $R_5$, $R_6$ and b have the same values as in Formula I above. These "dihydro" compounds are synthesized by reacting the corresponding indole having a double bond in the 2:3 position with tin in hydrochloric acid. The reduction is carried out at elevated temperature for about 8–20 hours. Preferably, however, they are obtained by reducing the N–1 unsubstituted indole ester of the formula

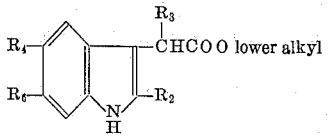

with the metal-hydrochloric acid reducing agent to form the corresponding 2,3-dihydro compound, and aralkylating this reduced material with the functionally substituted benzyl halide by the method described above. When $R_2$ is hydrogen, an alternate synthesis of the 2,3-dihydro derivatives comprises reduction of an indole of the structure

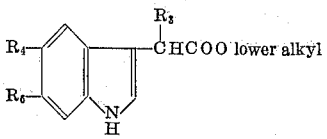

where $R_3$, $R_4$ and $R_6$ are as defined above, with hydrogen in the presence of Raney nickel catalyst. The resulting 2,3-dihydro compound is aralkylated as previously described. As will be understood by those skilled in the art, when $R_4$ and/or $R_6$ represent reducible groups that would be affected by the reaction conditions, they are suitably protected by known methods prior to the reduction of the indolyl aliphatic acid ester.

It will be appreciated that the compounds of Formula I above possess a center of asymmetry when $R_1$ or $R_3$ are other than hydrogen. In the syntheses described above such substances are obtained as racemic mixtures. Since the anti-inflammatory activity of our α-(1-functionally substituted benzyl-3-indolyl)-aliphatic acids is in the (+) stereoisomer (which may also be referred to as the d-isomer), it is sometimes desirable to resolve the racemic mixtures into their optically-active isomers and use the (+) stereoisomer in treating inflammatory conditions. This resolution may be accomplished using an optically-active salt of α-phenethylamine. For instance, on treatment of the racemic mixture of an α-[1-functionally substituted benzyl-3-loweralkyl-5-loweralkoxy (or loweralkyl)-3-indolyl]-propionic acid with (+)-α-phenethylamine in an alcoholic medium, the (+)-α-phenethylamine salt of the (+)-α-[1-functionally substituted benzyl-2-loweralkyl-5-loweralkoxy (or loweralkyl)-3-indolyl]-propionic acid crystallizes from solution while the phenethylamine salt of the (−)-indolyl propionic acid remains in solution. The insoluble salt is recovered by filtration and the desired (+) isomer of the indolyl propionic acid obtained by decomposing the (+)-phenethylamine salt with dilute hydrochloric acid. The more soluble (+)-α-phenethylamine salt of (−)-α-[1-functionally substituted benzyl-2-loweralkyl-5-loweralkoxy (or loweralkyl)-3-indolyl]-propionic acid may be recovered by removal of the reaction solvent in vacuo and also decomposition with dilute hydrochloric acid.

Conversely, when (−)-α-phenethylamine is employed as resolving agent, the amine salt of the (−)-α-(3-indolyl)-propionic acid is the less soluble and crystallizes from solution while the salt of the (+)-α-(3-indolyl)-propionic acid remains in solution.

The following examples are given for the purpose of illustration and not by way of limitation:

*Example 1.—Ethyl α-(2-methyl-5-methoxy-3-indolyl)-propionate*

A solution of 25 g. of p-methoxyphenylhydrazine hydrochloride and 20 g. of ethyl α-methyl levulinate in 250 ml. of 2 N ethanolic hydrochloride is heated on a steam bath for a few minutes. An exothermic reaction takes place with the separation of ammonium chloride. The reaction flask is removed from the steam bath and the mixture allowed to reflux gently until the initial reaction subsides. The mixture is again heated on a steam bath under reflux for 30 minutes, and then concentrated in vacuo to a volume of about 80 ml. The concentrate is diluted with about 400 ml. of water and extracted with ether. The resulting ethereal extract is washed with a saturated solution of sodium bicarbonate, and with water, and dried over anhydrous sodium sulfate. The dried solution is filtered and evaporated to a dark brown syrup which is purified by chromatography over about 1 lb. of acid-washed alumina in a 2¼″ I.D. column using mixtures of ether and petroleum ether (v./v. 9:1 to 1:1) as eluent. The light yellow syrup so obtained is distilled in a short-path distillation apparatus and the product collected at B.P. 150–153° C. (0.25 mm.). The distillate of ethyl α-(2-methyl-5-methoxy-3-indolyl)-propionate crystallizes on trituration with petroleum ether, M.P. 53–55.5° C. On recrystallization from a mixture of ether and petroleum ether, the melting point is unchanged.

Calcd. for $C_{15}H_{19}O_3N$: C, 68.94; H, 7.33; N, 5.36. Found: C, 69.23; H, 7.31; N, 5.60.

When the methyl, propyl, isopropyl or benzyl ester of α-methyl levulinic acid is employed in the above reaction in place of the ethyl ester, there is obtained methyl α-(2-methyl-5-methoxy-3-indolyl)-propionate, propyl α-(2-methyl-5-methoxy-3-indolyl)-propionate, isopropyl α-(2-methyl-5-methoxy-3-indolyl)-propionate, or benzyl α-(2-methyl-5-methoxy-3-indolyl)-propionate, respectively.

*Example 2.—Ethyl α-(1-o-chlorobenzyl-2-methyl-5-methoxy-3-indolyl)-propionate*

A solution of 13 g. (0.05 m.) of ethyl α-(2-methyl-5-methoxy-3-indolyl)-propionate in 75 ml. of dimethylformamide is added to a stirred suspension of 2.5 g. of a sodium hydride-mineral oil dispersion (containing 52 wt. percent NaH) in 100 ml. of dimethylformamide. The mixture is allowed to stir at room temperature for 1 hour, during which time the sodio derivative of ethyl α-(2-methyl-5-methoxy-3-indolyl)-propionate forms. 8.0 g. of o-chlorobenzyl chloride is then added slowly to this mixture, and the resulting reaction mixture allowed to stand at room temperature for about 14 hours. 500 ml. of water is then added and the whole extracted with ethyl ether. The ethereal extract is washed successively with dilute sodium bicarbonate solution and with water, dried over sodium sulfate and filtered. The ether is removed in vacuo and the residue taken up in a small volume of benzene-petroleum ether. This solution is poured onto a chromatographic column (2¼″ I.D.) containing 1 lb. of acid-washed alumina. The column is eluted with petroleum ether containing increasing amounts of ethyl ether. The fractions containing up to 30% ethyl ether are concentrated in vacuo and the residues examined in the infra-red for absence of N—H absorption. The residues lacking N—H absorption are combined and crystallized from benzene-Skellysolve B (petroleum ether) to give substantially pure ethyl α-(1-o-chlorobenzyl-2-methyl-5-methoxy-3-indolyl)-propionate, M.P. 118–122° C.

*Example 3.—α-(1-o-chlorobenzyl-2-methyl-5-methoxy-3-indolyl)-propionic acid*

The ethyl ester obtained in Example 2 is treated with 125 ml. of ethanol and 20 ml. of 34% sodium hydroxide at reflux temperature for 3 hours. The resulting solution is allowed to stand at room temperature for 3 days and then diluted with 250 ml. of water, concentrated in vacuo to a volume of about 200 ml., and extracted with ether. The aqueous layer is separated and acidified with 2.5 N hydrochloric acid whereupon α-(1-o-chlorobenzyl-2-methyl-5-methoxy-3-indolyl)-propionic acid crystallizes. The crystalline acid is recovered by filtration, washed with water, and dried. A total of 8.5 g. of product are obtained. On recrystallization from benzene, the product melts at 191–2° C.

Salts of α-(1-o-chlorobenzyl-2-methyl-5-methoxy-3-indolyl)-propionic acid, such as the sodium, potassium, lithium, calcium and ammonium salts, are prepared by treating the free acid with an aqueous solution of an ammonium, alkali metal or alkaline earth metal carbonate or an ammonium or alkali metal hydroxide. It is preferred for convenience sake to mix an alcoholic solution of the free acid with the solution of base. In a similar fashion, organic amine salts are prepared by contacting the acid with amines such as alkylamines, choline, pyridine and the like.

*Example 4.—α-(1-m-chlorobenzyl-2-methyl-5-methoxy-3-indolyl)-propionic acid*

When the procedures of Examples 2 and 3 are followed, using m-chlorobenzyl chloride in place of the o-chlorobenzyl chloride of Example 2, there is obtained successively ethyl α-(1 - m-chlorobenzyl-2-methyl-5-methoxy-3-indolyl)-propionate, and α-(1-m-chlorobenzyl-2-methyl-5-methoxy-3-indolyl)-propionic acid, M.P. 191–2° C. on recrystallization from ethyl acetate-Skellysolve B (petroleum ether).

*Example 5.—α-(1-o,p-dichlorobenzyl-2-methyl-5-methoxy-3-indolyl)-propionic acid*

Application of the method of Example 2 to the reaction of ethyl α-(2 - methyl-5-methoxy-3-indolyl)-propionate with o,p-dichlorobenzyl chloride yields ethyl α-(1-o,p-dichlorobenzyl - 2 - methyl-5-methoxy-3-indolyl)-propionate, which on recrystallization from aqueous ethanol has M.P. 130° C.

When this product is saponified according to the process of Example 3, there is produced α-(1-o,p-dichlorobenzyl-2-methyl-5-methoxy-3-indolyl)-propionic acid, M.P. 184–186° C.

*Example 6.—Ethyl α-(2,5-dimethyl-3-indolyl)-propionate*

20 g. of p-methylphenylhydrazine hydrochloride and 20 g. of ethyl α-methyl levulinate are added to 250 ml. of 2 N ethanolic hydrogen chloride and the mixture warmed until reaction sets in. After the initial exothermic reaction stops, the mixture is refluxed for about one-half hour and then concentrated in vacuo to about ⅓ volume. 400 ml. of water are added and the aqueous solution extracted with ether. The ether extracts are washed with sodium bicarbonate solution and with water, then dried over sodium sulfate. The ether solution is concentrated to a small volume in vacuo and chromatographed over acid-washed alumina (1 lb. of alumina in a 2¼" I.D. column). The material eluted with ether-petroleum ether (v./v. 9:1 to 1:1) is distilled in a short-path distillation apparatus. Ethyl α-(2,5-dimethyl-3-indolyl)-propionate distills at 150–170° C. (bath temp.)/1 mm., and crystallizes on trituration with petroleum ether, M.P. 88–88.5° C.

Other esters of α-(2,5-dimethyl-3-indolyl)-propionic acid, such as the methyl-i-propyl, propyl and benzyl esters, are obtained by carrying out the above process with the corresponding ester of α-methyl levulinic acid.

*Example 7.—α-(1-p-chlorobenzyl-2,5-dimethyl-3-indolyl)-propionic acid*

Following the procedures of Examples 2 and 3, and employing 0.05 m. of p-chlorobenzyl chloride and ethyl α-(2,5-dimethyl-3-indolyl)-propionate as the reactants in the process of Example 2, there is obtained successively ethyl α-(1-p-chlorobenzyl-2,5-dimethyl-3-indolyl)-propionate, M.P. 89–90° C., and α-(1-p-chlorobenzyl-2,5-dimethyl-3-indolyl)-propionic acid, M.P. 185–186° C.

*Example 8.—α-(1-p-methoxybenzyl-2-methyl-5-methoxy-3-indolyl)-propionic acid*

A. To 6 g. of 51% sodium hydride-mineral oil dispersion in 100 ml. of dry dimethylformamide is added 26 g. (0.1 m.) of ethyl α-(2-methyl-5-methoxy-3-indolyl)-propionate in 200 ml. of dimethylformamide with stirring. After 1 hour, 18 g. of p-methoxybenzyl chloride is added dropwise and the mixture allowed to stand at room temperature for about 15 hours. The solution is diluted with water and extracted with ether. The ethereal solution is washed with water 3 times, dried over sodium sulfate, filtered and evaporated to a syrup. The syrup is dissolved in 10 ml. of benzene and 200 ml. of petroleum ether and chromatographed in a 2¼" I.D. column on 1.25 lb. of acid-washed alumina. Elution with petroleum ether-ether (9:1) gives 16 g. of ethyl α-(1-p-methoxybenzyl-2-methyl-5-methoxy-3-indolyl)-propionate as a yellow syrup. Infrared spectrum shows no NH absorption band in the 3μ region.

B. 6 g. of the ester obtained above is treated with 150 ml. of 1 N sodium hydroxide in 90% ethanol at reflux temperature for 4 hours. The solution is concentrated in vacuo to about 50 ml., diluted with 200 ml. of water and extracted with 200 ml. of ether. On acidification of the aqueous solution with 2.5 N hydrochloric acid, 4 g. of α-(1-p-methoxybenzyl-2-methyl-5-methoxy-3-indolyl)-propionic acid precipitates, which on recrystallization from benzene-petroleum ether melts at 153–153.5° C.

Calcd. for $C_{21}H_{23}NO_4$: C, 71.37; H, 6.56; N, 3.96. Found: C, 71.30; H, 6.58; N, 4.23.

*Example 9.—α-(1-p-fluorobenzyl-2-methyl-5-methoxy-3-indolyl)-propionic acid*

13 g. (0.05 m.) of ethyl α-(2-methyl-5-methoxy-3-indolyl)-propionate in 75 ml. of dimethylformamide is added with stirring to 2.5 g. of sodium hydride-mineral oil suspension (52% by wt. NaH) in 100 ml. of dimethylformamide. The resulting mixture is stirred at room temperature for 1 hour; the sodio derivative of ethyl α-(2-methyl-5-methoxy-3-indolyl)-propionate is formed. 7.0 g. of p-fluorobenzyl chloride in 20 ml. of dimethylformamide is added to this sodio derivative, and the mixture stirred at room temperature for 15 hours.

500 ml. of water is added to the reaction mixture and the resulting solution extracted with about an equal volume of ethyl ether. The ether solution is washed with 1% sodium bicarbonate solution and with water, dried and filtered. The filtrate is concentrated in vacuo to remove the ether, and the residue dissolved in benzene-petroleum ether. The solution is chromatographed on 1 lb. of acid-washed alumina in a 2¼" I.D. column. Elution with petroleum ether-ether as described in Example 2 gives ethyl α-(1-p-fluorobenzyl-2-methyl-5-methoxy-3-indolyl)-propionate.

The product thus obtained is refluxed for 3 hours in a mixture of 125 ml. of ethanol and 20 ml. of 34% sodium hydroxide. The solution is cooled and diluted with about 250 ml. of water. It is then concentrated in vacuo to about one-half volume and extracted with an equal volume of ether. The layers are separated and the aqueous solution acidified slowly with 2.5 N hydrochloric acid. α-(1-p-fluorobenzyl-2-methyl-5-methoxy-3-indolyl) - propionic acid crystallizes. It is isolated by filtration and recrystallized from ethyl acetate-petroleum ether, M.P. 164–165° C.

*Example 10.—α-(1-p-hydroxybenzyl-2-methyl-5-methoxy-3-indolyl)-acetic acid*

0.05 m. of ethyl α-(2-methyl-5-methoxy-3-indolyl)-acetate is converted to its sodio derivative and the latter compound reacted with 0.05 m. of p-benzyloxybenzyl chloride following the procedure set forth in Example 2. The ethyl α-(1-p-benzyloxybenzyl-2-methyl-5-methoxy-3 - indolyl)-acetate is saponified to α-(1-p-benzyloxybenzyl-2-methyl-5-methoxy-3-indolyl)-acetic acid with sodium hydroxide by the method described in Example 3. Treatment of the latter compound in ethanol with hydrogen in the presence of 10% palladium on charcoal catalyst at a pressure of 40 p.s.i. yields α-(1-p-hydroxybenzyl-2-methyl-5-methoxy-3-indolyl)-acetic acid.

*Example 11.—Ethyl α-(1-p-difluoromethylthiobenzyl-2-methyl-5-methoxy-3-indolyl)-propionate*

A. *p-Difluoromethylthiotoluene.*—100 g. (0.8 m.) of p-mercaptotoluene in 250 ml. of dry dimethoxyethane is added dropwise over a 2-hr. period to a stirred suspension of 41.5 g. (0.86 m.) of 50% sodium hydride-mineral oil in 100 ml. of dimethoxyethane at a temperature of between −5° C. and 0° C. When all the p-toluenethiol is added, 20 ml. of tertiary butanol is added, and the reaction mixture stirred for 15 minutes at 0° C. Chlorodifluoromethane ("Freon 22") is then bubbled into the mixture with stirring for 45 minutes, keeping the temperature between −2° C. and 0° C. The reaction flask is stoppered and let stand at room temperature for 14 hours. The precipitated sodium chloride is then collected by suction filtration and washed well with ethyl ether. The yellow filtrate is poured into a 1 liter round-bottomed flask and the ether and dimethoxyethane removed by distillation. The residual yellow liquid is dissolved in 500 ml. of ethyl ether and washed with two 250-ml. portions of 5% sodium hydroxide, followed by four 250-ml. portions of water. The clear yellow organic phase is separated and dried over anhydrous sodium carbonate. The drying agent is removed by filtration and the ether evaporated. The yellow liquid residue is distilled in vacuo to yield 112.3 g. (80.6% yield) of p-difluoromethylthiotoluene, B.P. 32–34°/0.35 mm., $N_D^{23}$=1.5092.

B. *p-Difluoromethylthiobenzyl bromide.*—A mixture of 8.7 g. (0.05 m.) of p-difluoromethylthiotoluene and 8.9 g. (0.05 m.) of N-bromosuccinimide in 400 ml. of carbon tetrachloride is irradiated with a 275 watt General Electric sun lamp for 2 hours in a flask equipped with a magnetic stirrer, reflux condenser and drying tube. Refluxing of the carbon tetrachloride occurs after 1 hour. The reaction mixture turns yellow and the succinimide which forms comes to the top of the solution. The reaction mixture is cooled, and the succinimide removed by suction filtration. The clear yellow filtrate is washed with sodium bisulfite solution, 5% sodium hydroxide solution, and finally with distilled water. The organic phase is separated, dried over anhydrous magnesium sulfate and the solvent removed in vacuo to yield an orange oil. Distillation of this oil in vacuo gives 7.0 g. of p-difluoromethylthiobenzyl bromide, B.P. 74°/0.3 mm., $N_D^{22}$=1.5622. Anhydrous sodium carbonate is added to the distillate, and it is then redistilled in vacuo in the presence of sodium carbonate, 6.4 g. of p-difluoromethylthiobenzyl bromide is obtained, B.P. 74°/0.3 mm., $N_D^{22}$=1.5625.

C. *Ethyl α-(1-p-difluoromethylthiobenzyl-2-methyl-5-methoxy-3-indolyl)-propionate.*—To a cold suspension of 1.2 g. of 50% sodium hydride-mineral oil (0.025 m.) in 25 ml. of dry dimethylformamide is added dropwise with stirring a solution of 6.1 g. (0.025 m.) of ethyl α-(2-methyl-5-methoxy-3-indolyl)-propionate in 30 ml. of dry dimethylformamide. The reaction mixture is stirred under nitrogen for 30 minutes at room temperature, cooled to 0° C., and 6.4 g. (0.025 m.) of p-difluoromethylthiobenzyl bromide added in one portion. The reaction mixture is allowed to stir under nitrogen for 15 hours. The dimethylformamide is then removed in vacuo and the residue extracted into an ethyl ether-water mixture. The layers are separated and the ether layer washed with two 150-ml. portions of 10% sodium hydroxide, one 100-ml. portion of 5% hydrochloric acid, and finally with three 100-ml. portions of distilled water. The ether layer is separated, dried over anhydrous sodium sulfate, and the ether removed in vacuo to yield an oil. This oil is chromatographed on 500 g. of acid-washed alumina and eluted successively with 1:1 benzene-petroleum ether and benzene. The desired ethyl α-(1-p-difluoromethylthiobenzyl-2-methyl-5-methoxy-3-indolyl)-propionate is in the benzene eluate. Evaporation of the benzene eluates in vacuo yields 4.7 g. of ethyl α-(1-p-difluoromethylthiobenzyl-2-methyl-5-methoxy-3 - indolyl)-propionate as an orange oil.

*Example 12.—α-(1-p-difluoromethylthiobenzyl-2-methyl-5-methoxy-3-indolyl)-propionic acid*

The product obtained in Example 11 is dissolved in 60 ml. of ethanol containing 15 ml. of 30% sodium hydroxide, and the resulting mixture refluxed for 3 hours on a steam bath. The ethanol is then removed in vacuo and the resulting residue dissolved in distilled water. The aqueous solution is extracted with several portions of ether, and then acidified to pH 1 with concentrated hydrochloric acid. The product is extracted into 400 ml. of ether. The ether extract is washed with water, dried over anhydrous sodium sulfate and the ether removed in vacuo. The residue is twice crystallized from 20 ml. of carbon tetrachloride, followed by one crystallization from hot toluene. The crystals of α-(1-p-difluoromethylthiobenzyl-2-methyl-5-methoxy-3-indolyl) - propionic acid are collected by suction filtration and dried in vacuo over phosphorus pentoxide, M.P. 132–133° C.

*Example 13.—Ethyl α-(1-p-difluoromethoxybenzyl-2-methyl-5-methoxy-3-indolyl)-propionate*

A. *p-Difluoromethoxytoluene.*—1 m. (108.1 g) of p-cresol is added dropwise with stirring, over a 2-hr. period, to a suspension of 26.4 g. (1.1 m.) of sodium hydride (50% suspension in mineral oil) in 250 ml. of dry dimethoxyethane. Cooling is effected with an ice salt bath. At the end of the addition, 10 ml. of t-butanol is added. The mixture is then stirred at room temperature for 45 minutes. A solution of 98.8 g. (1.14 m.) of chlorodifluoromethane in 250 ml. of dry dimethoxyethane is then added and the reaction mixture stirred at room temperature for 14 hours. The reaction mixture is finally heated on a steam bath for 1 hour. The dimethoxyethane is then removed by vacuum distillation, and the residue extracted with about 800 ml. of ether. The ether extract is washed with three 500-ml. portions of 0.5 N NaOH followed by two 500-ml. portions of distilled water. The ether layer is then dried over $Na_2SO_4$, the drying agent removed, and the ether removed in vacuo. The residue is distilled in vacuo from 2 ml. of quinoline. The fractions giving a positive fluorine test are combined and distilled from quinoline at atmospheric pressure to give 18.5 g. of p-difluoromethoxytoluene, B.P. 165–167° C.

B. *p-Difluoromethoxybenzyl bromide.*—A mixture of 14.6 g. (0.092 m.) of p-difluoromethoxytoluene and 16.4 g. (0.092 m.) of N-bromosuccinimide in 800 ml. of carbon tetrachloride is irradiated with a 275 watt G.E. sunlamp for 2 hours. Refluxing of the carbon tetrachloride occurs during the last hour. The succinimide that forms is removed by filtration and the clear yellow filtrate washed with sodium bisulfite solution, 2 N sodium hydroxide solution and finally with distilled water. The organic phase is dried and the solvent removed in vacuo to yield 18.5 g. of an orange oil which is distilled in vacuo to give p - difluoromethoxybenzyl bromide, B.P.=50–52° C./0.2 mm., $N_D^{23}$ 1.5170.

C. *Ethyl α - (1-p-difluoromethoxybenzyl-2-methyl-5-methoxy-3-indolyl)-propionate.*—To a cold suspension of 2.4 g. of 50% sodium hydride-mineral oil (0.05 m.) in 25 ml. of dry dimethylformamide is added dropwise with stirring a solution of 13.0 g. (0.05 m.) of ethyl α-(2-methyl-5-methoxy-3-indolyl)-propionate in 35 ml. of dry dimethylformamide. The reaction mixture is stirred for 30 minutes at room temperature, cooled to 0° C. and 12 g. (0.051 m.) of p-difluoromethoxybenzyl bromide is added in one portion. The flask is stoppered and stirred for 15 hours at room temperature. The dimethylformamide is then removed in vacuo and the residue dissolved in ether. The ether solution is washed successively with water, 1 N hydrochloric acid and water. The ether layer is separated, dried and the ether removed in vacuo to yield 20.9 g. of ethyl α-(1-p-difluoromethoxybenzyl-2-methyl-5-methoxy-3-indolyl)-propionate as an orange oil.

*Example 14.—α-(1-p-difluoromethoxybenzyl-2-methyl-5-methoxy-3-indolyl)-propionic acid*

Treatment of the ethyl α-(1-p-difluoromethoxybenzyl-2-methyl-5-methoxy-3-indolyl)-propionate of Example 13 with ethanolic sodium hydroxide and purification by the method of Example 12 yields α - (1 - difluoromethoxybenzyl-2-methyl-5-methoxy-3-indolyl) - propionic acid, M.P. 144–146° C.

*Example 15.—Ethyl α-(1-p-chlorobenzyl-2-methyl-5-methoxy-3-indolyl)-propionate*

To a suspension of 2.5 g. of sodium hydride-mineral oil dispersion (52% sodium hydride by wt.) in 100 ml. of dimethylformamide is added with mechanical stirring 13 g. of ethyl α-(2-methyl-5-methoxy-3-indolyl)-propionate in 75 ml. of dimethylformamide. The mixture is stirred at room temperature for 1 hour, and then 8.0 g. of p-chlorobenzyl chloride added dropwise. The p-chlorobenzyl chloride reacts with the sodio derivative of ethyl α-(2-methyl - 5 - methoxy-3-indolyl) - propionate almost immediately with the formation of insoluble sodium chloride. After the reaction mixture has stood at room temperature for about 15 hours, about 500 ml. of water is added and the mixture is extracted with ether. The ethereal extract is washed with sodium bicarbonate solution once and with water three times. It is then dried over sodium sulfate, filtered, and concentrated in vacuo to give a light brown oil. The oil is dissolved in 200 ml. of benzene-petroleum ether mixture (1:10 v./v.) and chromatographed on a 2¼″ I.D. column packed with 1 lb. of acid-washed alumina using petroleum ether containing increasing amounts of diethyl ether as eluents. The separation of ethyl α-(1-p-chlorobenzyl-2-methyl-5-methoxy-3-indolyl)-propionate and unchanged starting material is evidenced by the absence of N—H absorption in the infrared spectrum of the former. The solvents are removed in vacuo from the fractions eluted with petroleum ether containing up to 30% of diethyl ether and the residual oils tested for N—H absorption in the infrared. Those fractions lacking N—H absorption are combined and the oil of ethyl α-(1-p-chlorobenzyl-2-methyl-5-methoxy-3-indolyl)-propionate used in the next step of the process without further purification.

Other esters of α-(1-p-chlorobenzyl-2-methyl-5-methoxy-3-indolyl)-propionic acid, such as the methyl, propyl, isopropyl and benzyl esters, are prepared by the above method using as starting material the appropriate ester of α-(2-methyl-5-methoxy-3-indolyl)-propionic acid.

*Example 16. — α-(1-p-chlorobenzyl-2-methyl-5-methoxy-3-indolyl)-propionic acid*

The ethyl ester obtained as in Example 15 is treated with 125 ml. of ethanol and 20 ml. of 34% sodium hydroxide at reflux temperature for 3 hours. The resulting solution is allowed to stand at room temperature for 3 days and then diluted with 250 ml. of water, concentrated in vacuo to a volume of about 200 ml., and extracted with ether. The aqueous layer is separated and acidified with 2.5 N hydrochloric acid whereupon α-(1-p-chlorobenzyl-2-methyl-5-methoxy-3-indolyl)-propionic acid crystallizes. The crystalline acid is recovered by filtration, washed with water, and dried. A total of 8.5 g. of product are obtained. On recrystallization from benzene, the product melts at 163–165° C.

Calcd. for $C_{19}H_{18}O_3NCl$: C, 66.8; H, 5.6; N, 3.91. Found: C, 66.75; H, 5.68; N, 4.11.

Infrared absorption (in chloroform) shows broad bonded 3–4.4μ absorption, carboxyl absorption at 5.82μ and absorption due to the unsaturated rings at 6.1, 6.24 and 6.66μ.

Ultraviolet absorption (ethanol): $\lambda_{max}$ 2210 A., E percent 1029; $\lambda_{max}$ 2800, E percent 250; $\lambda_{max}$ (shoulder) 2975 A., E percent 190; $\lambda_{max}$ (infl.) 3100 A., E percent 129.

Other esters may be converted to the free acid employing the above process.

Salts of α - (1 - p - chlorobenzyl-2-methyl-5-methoxy-3-indolyl)-propionic acid, such as the aluminum, magnesium, sodium, potassium, lithium, calcium and ammonium salts, are prepared by treating the free acid with an aqueous solution of an ammonium, alkali metal or alkaline earth metal carbonate or a hydroxide such as aluminum, magnesium or alkali metal hydroxide. It is preferred for convenience sake to contact an alcoholic solution of the free acid with the solution of base. In a similar fashion, organic amine salts are prepared by contacting the acid with amines such as alkylamines, choline, pyridine glucosamine and the like.

*Example 17.—α-(2-methyl-5-methoxy-3-indolyl)-propionic acid*

13 g. of ethyl α-(2-methyl-5-methoxy-3-indolyl)-propionate is treated with 200 ml. of ethanol and 20 ml. of 34% sodium hydroxide at reflux temperature under nitrogen for 6 hours. 300 ml. of water is then added, and the solution concentrated in vacuo to a volume of about 200 ml. The concentrate is extracted with 2 x 100 ml. of ether, and the aqueous solution acidified with dilute hydrochloric acid. The resulting precipitate of α-(2-methyl-5-methoxy-3-indolyl)-propionic acid is collected, dried and recrystallized from aqueous ethanol, M.P. 163–165° C.

Calcd. for $C_{13}H_{15}NO_3$: C, 66.93; H, 6.48; N, 6.01. Found: C, 67.07; H, 6.54; N, 6.11.

Infrared spectrum (in chloroform) shows N–H absorption at 2.89μ; carboxyl absorption at 3.4μ (broad) and 5.86μ; and substituted benzene absorption at 6.13μ and 6.25μ.

In a similar fashion, α-(2-methyl-5-methoxy-3-indolyl)-propionic acid is produced from other esters of the acid such as the benzyl or lower alkyl esters.

*Example 18. — α-(1-p-chlorobenzyl-2-methyl-5-methoxy-3-indolyl)-propionic acid*

To a suspension of 5.0 g. (0.1 m.) of emulsified sodium hydride (52% by wt.) in mineral oil in 300 ml. of dry dimethylformamide is added in portions with stirring 11.7 g. (0.05 m.) of α-(2-methyl-5-methoxy-3-indolyl)-propionic acid. After 1 hour, a solution of 8.8 g. (0.055 m.) of p-chlorobenzyl chloride in 40 ml. of dry dimethylformamide is added dropwise and the resulting mixture allowed to stand at room temperature for 18 hours and then diluted with 500 ml. of water and extracted with 200 ml. of ether to remove any neutral substances. The aqueous solution is acidified with dilute hydrochloric acid and the resulting precipitate of α-(1-p-chlorobenzyl-2-methyl-5-methoxy-3-indolyl)-propionic acid is collected, dried and purified by successive recrystallizations from ethanol and acetonitrile, M.P. 161–162° C.

*Example 19.—Ethyl α-(2-methyl-5-methoxy-2,3-dihydro-3-indolyl)-acetate*

18 g. of methyl α-(2-methyl-5-methoxy-3-indolyl)-acetate and 20 g. of mossy tin in 200 ml. of 6 N hydrochloric acid are heated under reflux for 18 hours. The solution is filtered and concentrated in vacuo to a volume of about 50 ml. Ethanol is added and the evaporation repeated in order to remove water. The residue is then treated with 200 ml. of 2 N ethanolic hydrogen chloride and the mixture refluxed for 18 hours. The solution is concentrated in vacuo to 50 ml., diluted with 300 ml. of water, and extracted with 200 ml. of ether. The aqueous solution is made alkaline with 2.5 N sodium hydroxide and filtered. The filtrate is extracted with 2 x 300 ml. of ether, washed with 100 ml. of water, dried over anhydrous potassium carbonate, filtered and evaporated in vacuo to give 2.7 g. of ethyl α-(2-methyl-5-methoxy-2,3-dihydro-3-indolyl)-acetate.

*Example 20.— α-(1-p-chlorobenzyl-2-methyl-5-methoxy-2,3-dihydro-3-indolyl)-acetic acid*

A. 0.1 m. of ethyl α-(2-methyl-5-methoxy-2,3-dihydro-3-indolyl)-acetate is added to a suspension of 5.5 g. of sodium hydride emulsion in mineral oil (52% sodium hydride) in 150 ml. of dry dimethylformamide with stirring under nitrogen. After one-half hour, 0.11 m. of p-chlorobenzyl chloride in 20 ml. of dimethylformamide is added dropwise and the mixture is stirred for another 6 hours. It is then diluted with 500 ml. of water and extracted with 500 ml. of ether. The ethereal solution is washed with 2 x 300 ml. of water, dried over potassium carbonate and evaporated in vacuo to give ethyl α-(1-p-chlorobenzyl-2-methyl-5-methoxy-2,3-dihydro-3-indolyl)-acetate.

B. 0.05 m. of the ester obtained in Part A above is dissolved in 200 ml. of 2.5 N hydrochloric acid and refluxed under nitrogen for 18 hours. The solution is then treated with decolorizing charcoal, filtered and concentrated in vacuo to a syrup. The syrup is dissolved in 100 ml. of ethanol and the solution again concentrated in vacuo to dryness. Recrystallization of the residue from isopropanol gives α-(1-p-chlorobenzyl-2-methyl-5-methoxy-2,3-dihydro-3-indolyl)-acetic acid as the hydrochloride salt.

C. When the reduction of Example 19 above is carried out using ethyl α-(2-methyl-5-methoxy-3-indolyl)-propionate as the starting material, there is obtained ethyl α-(2-methyl-5-methoxy-2,3-dihydro-3-indolyl)-propionate, which is converted to α-(1-p-chlorobenzyl-2-methyl-5-methoxy-2,3-dihydro-3-indolyl)-propionic acid hydrochloride salt by the procedures of Parts A and B above.

D. Other α-(1-substituted benzyl-2-methyl-5-methoxy-2,3-dihydro-3-indolyl)-propionic or acetic acids are synthesized by carrying out the processes of Parts A and B above with suitable aralkylating agents such as p-methoxybenzyl chloride, p-methylmercaptobenzyl chloride, p-fluorobenzyl chloride, p-nitrobenzyl chloride, p-cyanobenzyl chloride and the like. In this way there are produced dihydro derivatives of α-(1-p-methoxybenzyl-2-methyl-5-methoxy-3-indolyl)-acetic acid, α-(1-p-fluorobenzyl-2-methyl-5-methoxy-3-indolyl)-acetic acid, α-(1-p-methylmercaptobenzyl-2-methyl-5-methoxy-3-indolyl)-propionic acid, and α-(1-p-methylmercaptobenzyl-2-methyl-5-methoxy-3-indolyl)-acetic acid.

*Example 21.—Methyl[1-(α-p-chlorophenyl)-ethyl-2-methyl-5-methoxy-3-indolyl]-acetate*

9.3 g. of methyl (2-methyl-5-methoxy-3-indolyl)-acetate in 50 ml. of tetrahydrofuran is added to 3 g. of 52% sodium hydride-mineral oil dispersion in 100 ml. of dimethylformamide. After 1 hour, 13 g. of 1-bromo-1-(p-chlorophenyl)-ethane in 150 ml. of dry dimethylformamide is added thereto and the mixture stirred at room temperature for about 12 hours. At the end of this time, the reaction mixture is treated as in Example 2 to give methyl[1-(α-p-chlorophenyl)-ethyl-2-methyl-5-methoxy-3-indolyl]-acetate, which compound is saponified to the free acid by the procedure of Example 3.

*Example 22.—α-(1-halobenzyl-5-methoxy-3-indolyl)-acetic acid*

0.1 m. of p-methoxyphenylhydrazine (as the hydrochloride) and 0.1 m. of ethyl γ,γ-dimethoxybutyrate are refluxed in 200 ml. of 2 N ethanolic hydrogen chloride for about 45 minutes, and the reaction mixture then concentrated in vacuo to about one-third volume. The concentrate is diluted with 100 ml. of water and the ethyl (5-methoxy-3-indolyl)-acetate extracted into ether. The ester is purified as described in Example 1.

The ethyl (5-methoxy-3-indolyl)-acetate is aralkylated with p-fluorobenzyl chloride following the procedure of Example 9 to form ethyl (1-p-fluorobenzyl-5-methoxy-3-indolyl)-acetate which is saponified to the free acid with dilute potassium hydroxide.

When p-chlorobenzyl chloride is employed as the aralkylating agent, the product obtained on saponification is α-(1-p-chlorobenzyl-5-methoxy-3-indolyl)-acetic acid, M.P. 144–148° C.

*Example 23.—α-(1-p-methoxybenzyl-2-methyl-5-nitro-3-indolyl)-propionic acid*

A. Ethyl α-(2-methyl-5-nitro-3-indolyl)-propionate is prepared following the procedure described by M. Amovosa, Ann. Chim. (Rome) 46, 335, 451 (1956), for the preparation of 5-nitro-3-indolyl acetic acid. 10 g. of the p-nitro-phenylhydrazone of α-methyl levulinic acid and 28 g. of freshly fused zinc chloride in 20 ml. of absolute ethanol is refluxed under nitrogen for 12 hours. The reaction mixture is diluted with 200 ml. of 2.5 N hydrochloric acid and extracted with 3 x 200 ml. of ether. The ethereal solution is extracted with 2 x 100 ml. of 5% sodium carbonate, and the combined aqueous solution is acidified with 2.5 N hydrochloric acid, and reextracted with 3 x 150 ml. of ether. The ethereal solution is dried over sodium sulfate, concentrated in vacuo to a syrup and treated with 200 ml. of 1 N hydrogen chloride in ethanol at reflux temperature for 8 hours. The ethanolic solution is concentrated in vacuo to about 50 ml., diluted with 250 ml. of water and extracted with 3 x 150 ml. of ether. The ethereal solution is washed with 50 ml. of saturated sodium bicarbonate and dried over sodium sulfate. Evaporation of the ethereal solution gives a syrup which is purified by chromatography on 100 g. of acid-washed alumina using ether as eluent to give ethyl α-(2-methyl-5-nitro-3-indolyl)-propionate.

B. The ester obtained in Part A above is treated with sodium hydride and p-methoxybenzyl chloride following the procedure of Example 8A to produce ethyl α-(1-p-methoxybenzyl-2-methyl-5-nitro-3-indolyl)-propionate, which latter compound is heated with ethanolic sodium hydroxide by the method of Example 8B to give α-(1-p-methoxybenzyl-2-methyl-5-nitro-3-indolyl)-propionic acid.

C. 0.05 m. of α-(1-p-methoxybenzyl-2-methyl-5-nitro-3-indolyl)-propionic acid in 200 ml. of ethanol is hydrogenated in the presence of 250 mg. of 10% palladium on charcoal catalyst at 40 p.s.i. at room temperature. After 0.15 m. of hydrogen has been consumed, the hydrogenation is stopped, and the solution filtered to remove the catalyst. The filtrate is concentrated to dryness in vacuo to give α-(1-p-methoxybenzyl-2-methyl-5-amino-3-indolyl)-propionic acid.

*Example 24.—Ethyl α-(1-p-methoxybenzyl-2-methyl-5-amino-3-indolyl)-propionate*

A. 0.05 m. of ethyl α-(1-p-methoxybenzyl-2-methyl-5-nitro-3-indolyl)-propionate in 200 ml. of ethanol is hydrogenated in the presence of 250 mg. of 10% palladium on charcoal catalyst at 40 p.s.i. at room temperature. After 0.15 m. of hydrogen has been consumed, the hydrogenation is stopped, and the solution filtered to remove the catalyst. The filtrate is concentrated to dryness in vacuo to give ethyl α-(1-p-methoxybenzyl-2-methyl-5-amino-3-indolyl)-propionate.

B. 0.05 m. of the ethyl ester produced in Part A above is added to 100 ml. of dry pyridine, and this solution treated with 6 g. of acetic anhydride at room temperature for about 18 hours. The reaction mixture is then poured in 500 ml. of cold water. An immediate precipitate of ethyl α-(1-p-methoxybenzyl-2-methyl-5-acetamido-3-indolyl)-propionate forms which may be recovered by filtration and purified by recrystallization from ethyl acetate-benzene.

The ethyl ester obtained immediately above is converted to the free acid by refluxing 0.01 m. of the ester with 200 ml. of 0.1 N sodium hydroxide in 90% ethanol for 3 hours. The resulting solution is concentrated to a volume of about 50 ml., diluted with 200 ml. of water and extracted with two 100-ml. portions of ether. The aqueous layer is separated and acidified with 2.5 N hydrochloric acid. The α-(1-p-methoxybenzyl-2-methyl-5-acetamido-3-indolyl)-propionic acid which precipitates is purified by recrystallization from ethanol.

In like manner, α-(1-p-methoxybenzyl-2-methyl-5-p-chlorobenzamido-3-indolyl)-propionic acid is prepared, via the ethyl ester, by reacting ethyl α-(1-p-methoxybenzyl-2-methyl-5-amino-3-indolyl)-propionate with p-chlorobenzoyl chloride.

C. Ethyl α - (1 - p - methoxybenzyl - 2 - methyl - 5 - dimethylamino-3-indolyl)-propionate is obtained from the corresponding 5-amino compound by treating the latter material with a two molar excess of dimethyl sulfate in 10% sodium hydroxide solution at 0–5° C. for about 3 hours. At the end of this time, the reaction mixture is extracted with ether, and the ether extract washed with water, dried over potassium carbonate, filtered and concentrated to dryness to give the desired product substantially pure.

0.02 m. of this latter ester is dissolved in 200 ml. of 3 N hydrochloric acid and the mixture refluxed for 18 hours under nitrogen. At the end of this time, the solution is cooled, treated with activated charcoal, filtered and evaporated under reduced pressure to a volume of about 20 ml. 200 ml. of ethanol is added to this concentrate and the solution again evaporated, this time to dryness. Recrystallization of the residue thus obtained from a small amount of ethanol gives substantially pure α - (1 - p - methoxybenzyl - 2 - methyl - 5 - dimethylamino-3-indolyl)-propionic acid hydrochloride.

*Example 25.—α-(1-p-bromobenzyl-2-methyl-5-methoxy-3-indolyl)-propionic acid*

When the procedures of Examples 2 and 3 are carried out using 0.055 m. of p-bromobenzyl methanesulfonate or p-iodobenzyl p-toluenesulfonate in place of o-chlorobenzyl chloride, there are obtained α-(1-p-bromobenzyl-2-methyl-5-methoxy-3-indolyl)-propionic acid and α-(1-p-iodobenzyl-2-methyl-5-methoxy-3-indolyl)-propionic acid respectively.

The sulfonates employed as aralkylating agents are prepared by treating the p-halobenzyl alcohol with methanesulfonyl chloride or p-toluenesulfonyl chloride in pyridine in the cold for about 12 hours.

*Example 26.—α-(1-p-chlorobenzyl-2-ethyl-5-methyl-3-indolyl)-acetic acid*

A. A mixture of 5.4 ml. of 25% aqueous dimethylamine, 3 ml. of acetic acid and 2.25 ml. of 40% aqueous formaldehyde is cooled in an ice bath and added to 4.4 g. of 2-ethyl-5-methylindole. The indole dissolves rapidly and the solution is allowed to stand for 5 hours at room temperature. The addition of 25 ml. of 10% potassium hydroxide to the solution causes precipitation of a gum which is extracted into ether. The ether solution is washed with two 30-ml. portions of 1.25 N hydrochloric acid and the combined acidic extracts are neutralized and extracted with three 50-ml. portions of ether. The combined ether extracts are dried with anhydrous sodium sulfate and evaporated. The crystalline residue is recrystallized once from Skellysolve B (petroleum ether) and once from cyclohexane to give 2.3 g. of 2-ethyl-5-methylgramine, M.P. 100–103° C.

Calcd. for $C_{14}H_{20}N_2$: C, 77.73; H, 9.32; N, 12.95. Found: C, 77.52; H, 9.52; N, 12.54.

B. A solution of 2.0 g. of 2-ethyl-5-methylgramine and 4.0 g. of potassium cyanide in 32 ml. of 80% aqueous ethanol is refluxed for 68 hours. After cooling, the solution is neutralized with hydrochloric acid and concentrated under vacuum until most of the ethanol is removed. The residue is diluted with 20 ml. of water and 2.3 g. of potassium hydroxide is added. The resulting solution is refluxed 6 hours, cooled and extracted with ether. The aqueous phase is then acidified with hydrochloric acid and extracted with four 25-ml. portions of ether. The combined ether extracts are dried and evaporated to give 1.1 g. of crystalline acid. On crystallization of this residue from 20 ml. of benzene, 1.0 g. of α-(2-ethyl-5-methyl-3-indolyl)-acetic acid, M.P. 137–138° C., is obtained.

Calcd. for $C_{13}H_{15}NO_2$: C, 71.86; H, 6.96; N, 6.45. Found: C, 71.89; H, 6.93; N, 6.85.

C. 0.005 m. of α-(2-ethyl-5-methyl-3-indolyl)-acetic acid in 5 ml. of dimethylformamide is added to 0.01 m. of sodium hydride (dispersed in mineral oil) in 10 ml. of dimethylformamide. To the resultant sodio derivative of the acid is added 0.0055 m. of p-chlorobenzyl chloride. The reaction mass is stirred at room temperature for 90 minutes, at the end of which time 50 ml. of water is added and the α-(1-p-chlorobenzyl-2-ethyl-5-methyl-3-indolyl)-acetic acid recovered by the isolation procedure described in Example 18.

When this aralkylation reaction is carried out using p-methoxybenzyl chloride, p-dimethylsulfonamidobenzyl chloride or p-trifluoromethylbenzyl chloride in place of p-chlorobenzyl chloride, the corresponding α-(1-p-substituted benzyl-2-ethyl-5-methyl-3-indolyl)-acetic acids are obtained.

The 2-ethyl-5-methylindole used in the above experiment is prepared as follows:

Into a 2 liter 3-necked flask fitted with stirrer, nitrogen inlet, condenser, thermometer and dropping funnel is placed 50 g. of 2,4-dimethylpropionanilide, 50 g. of sodium amide and 500 ml. of diethylaniline in that order. A slow stream of nitrogen is passed in while the mass is stirred and heated to reflux temperature (ca. 210° C.). After 1 hour of refluxing, 250 ml. of water is added cautiously to the hot solution. The two-phase mixture is cooled in an ice bath and the layers are separated. The aqueous phase is extracted with two 250-ml. portions of ether and the extracts added to the original organic phase. This ether solution is then washed with four 250-ml. portions of 3.6 N hydrochloric acid. The washings are discarded and the organic phase dried and evaporated. The crystalline residue weighs 38 g., M.P. 60–70° C. Recrystallization of this product from cyclohexane gives 2-ethyl-5-methylindole, M.P. 72–84° C.

*Example 27.—α-(1-p-chlorobenzyl-2-methyl-5-methylmercapto-3-indolyl)-propionic acid*

A. 53.3 g. of p-aminothiophenol in 200 ml. of ethanol is mixed in a beaker with 60.2 g. of p-chlorobenzaldehyde in 200 ml. of ethanol with stirring. After 20 minutes, the solid mass which separates is collected on a filter, powdered in a mortar, washed with ethanol and dried in a vacuum disiccator to give 97 g. of N-p-chlorobenzylidene-4-mercaptoaniline.

B. 58.2 g. of this Schiff's base is added portionwise to a suspension of 11.52 g. of sodium hydride (52% in mineral oil) in 400 ml. of dimethylformamide over a period of 2 hours. 35 g. of methyliodide in 100 ml. of dimethylformamide is added dropwise with cooling and stirring over 1 hour. The reaction mixture is diluted with 2 liters of water and the N-p-chlorobenzylidene-4-methylmercaptoaniline collected on a filter, washed with water and dried.

C. To a suspension of 12 g. of N-p-chlorobenzylidene-4-methylmercaptoaniline in 300 ml. of methanol is added in small portions 4.0 g. of sodium borohydride with stirring and cooling. The resulting solution is stirred at room temperature for 30 minutes. The solution is treated with 0.1 N sodium hydroxide and the resulting precipitate collected, dried and recrystallized from benzene-Skellysolve B (petroleum ether) to give N-p-chlorobenzyl-4-methylmercaptoaniline.

Calcd. for $C_{14}H_{14}NSCl$: C, 63.8; H, 5.32; N, 5.32. Found: C, 63.98; H, 5.17; N, 5.53.

D. To a solution of 60 g. of N-p-chlorobenzyl-4-methylmercaptoaniline in 300 ml. of glacial acetic acid is added with stirring a solution of 16 g. of sodium nitrite in 60 ml. of water over 30 minutes. The mildly exothermic reaction is maintained at 25–8° C. with occasional cooling with an ice-water bath. The reaction mixture is stirred for an additional hour, diluted with 1.5 liters of water and filtered. The nitroso derivative is collected on a filter, washed with 100 ml. of 36% acetic acid, 200 ml. of water, 30 ml. of cold isopropanol and 50 ml. of petroleum ether and dried.

38 g. of the nitroso derivative is reduced with aluminum amalgam (from 7 g. aluminum and 3 g. mercuric acetate) in isopropanol to give $N_1$ - p - chlorobenzyl - 4-methylmercaptophenylhydrazine, isolated as the hydrochloride, M.P. 140.5° C. (from ethanol).

Calcd. for $C_{14}H_{16}N_2SCl$: C, 53.33; H, 5.08; N, 8.89. Found: C, 53.67; H, 5.20; N, 9.08.

Ring-closure of 31 g. of the above hydrazine with 16 g. of ethyl α-methyl levulinate in 400 ml. of 7.5 N ethanolic hydrogen chloride affords 13 g. of ethyl α-(1-p-chlorobenzyl - 2 - methyl - 5 - methylmercapto - 3 - indolyl)-propionate as a yellow syrup.

Treatment of 10.5 g. of the above ester in 250 ml. of ethanol and 20 ml. of 34% sodium hydroxide at reflux temperature for 4 hours, and isolation of the reaction product by the method of Example 3, gives α-(1-p-chlorobenzyl - 2 - methyl - 5 - methylmercapto - 3 - indolyl)-propionic acid, M.P. 154–160° C. (recrystallized from acetonitrile).

*Example 28.—α-(1-p-chlorobenzyl-2-methyl-5-methoxy-3-indolyl)-butyric acid*

When the procedure of Examples 1, 2 and 3 is followed using ethyl α-ethyl levulinate in place of ethyl α-methyl levulinate, there is obtained successively ethyl α-(2-methyl-5-methoxy-3-indolyl)-butyrate, ethyl α-(1-p-chlorobenzyl-2-methyl-5-methoxy-3-indolyl)-butyrate, and α -(1 - p - chlorobenzyl - 2 - methyl - 5 - methoxy - 3 - indolyl)-butyric acid.

The starting ethyl α-ethyl levulinate is prepared by alkylation of the sodio derivative of ethyl acetoacetate in ethanol with 1 m. of ethyl α-bromobutyrate, followed by hydrolysis and decarboxylation. The α-ethyl levulinic acid obtained is reesterified with 2 N ethanolic hydrogen chloride at reflux temperature for 18 hours.

*Example 29.—Ethyl α-(1-p-methylthiobenzyl-2-methyl-5-methoxy-3-indolyl)-propionate*

A solution of 120 g. of thioanisole and 69 g. of chloromethyl methyl ether in 600 ml. of acetic acid is heated in an oil bath at a bath temperature of 78–80° C. for 2 days. The solution is then concentrated in vacuum to remove the acetic acid, and the residual syrup is fractionated at 1.0 mm. After the removal of a forerun (2.4 g.) with B.P. 40–43° C. (1 mm.), 68 g. of p-methylthiobenzyl chloride is collected at B.P. 99° C. (1 mm.).

500 ml. of dry dimethylformamide and 5.04 g. (0.105 m.) of 50% sodium hydride-mineral oil emulsion are stirred in an ice-salt bath for 20 minutes. Then 26.1 g. (0.10 m.) of ethyl α-(2-methyl-5-methoxy-3-indolyl)-propionate is added and stirring continued for 20 minutes. Finally 18.16 g. (0.105 m.) of p-methylthiobenzyl chloride is added over a period of 20 minutes and the reaction mixture allowed to warm slowly to room temperature over a period of 6 hours. The reaction mixture is then poured into 1500 ml. of ice and water and extracted with 3 x 250-ml. portions of ether. The ether extracts are combined and washed with 5 x 400-ml. portions of water, and then dried over sodium sulfate. The drying agent is filtered off and the ether solution concentrated to a syrup which consists of ethyl α-(1-p-methylthiobenzyl-2-methyl-5-methoxy-3-indolyl)-propionate. The syrup shows no NH absorption in the infrared.

*Example 30.—α-(1-p-methylthiobenzyl-2-methyl-5-methoxy-3-indolyl)-propionic acid*

A mixture of 7 g. (0.017 m.) of ethyl α-(1-p-methylthiobenzyl - 2 - methyl - 5 - methoxy - 3 - indolyl) - propionate (obtained as in Example 29), 7 ml. of 34% sodium hydroxide, 7 ml. of water and 126 ml. of ethanol are refluxed for 2 hours and then concentrated to remove ethanol. 100 ml. of water is added to the concentrate and this solution extracted with two 100-ml. portions of ether. The aqueous solution is made acidic with 2.5 N hydrochloric acid. A gum forms which crystallizes on standing and scratching. This solid is recovered by filtration and recrystallized from ethyl acetate-petroleum ether, then from benzene-petroleum ether to give crystalline α-(1-p-methylthiobenzyl-2-methyl-5-methoxy-3-indolyl)-propionic acid, M.P. 170–171° C.

*Example 31.—α-(1-p-chlorobenzyl-2-methyl-5-chloro-3-indolyl)-acetic acid*

A. Condensation of 0.1 m. of p-chlorophenylhydrazine hydrochloride and 0.1 m. of ethyl levulinate in 300 ml. of 2 N ethanolic hydrogen chloride at reflux temperature for 1 hour gives, after purification of the reaction mixture by column chromatography on 1 lb. of acid-washed alumina using ether-petroleum ether (v./v. 1:9) as eluent, ethyl-2-methyl-5-chloro-3-indolyl acetate, M.P. 85° C., on recrystallization from petroleum ether.

B. Treatment of the above ester (0.1 m.) with 0.11 m. of 51% sodium hydride in mineral oil dispersion in 200 ml. of dimethylformamide, followed by addition of 0.11 m. of p-chlorobenzyl chloride, gives ethyl 1-p-chlorobenzyl-2-methyl-5-chloro-3-indolyl acetate, which is saponified with 1 N sodium hydroxide in 90% ethanol at reflux temperature for 2 hours to give 1-p-chlorobenzyl-2-methyl-5-chloro-3-indolyl acetic acid.

*Example 32.—α-(1-p-chlorobenzyl-2-phenyl-5-methoxy-3-indolyl)-acetic acid*

A mixture of 20 g. of $N_1$-p-chlorobenzyl-p-methoxyphenylhydrazine hydrochloride and 15 g. of ethyl 3-benzoyl propionate in 300 ml. of 2 N ethanolic hydrogen chloride is refluxed for 3½ hours. The dark solution is filtered, evaporated in vacuo to a syrup, and partitioned between 300 ml. of ether and 600 ml. of water. The ether solution is washed with sodium bicarbonate and with water, and dried over sodium sulfate. Evaporation of the dried solution and purification of the residue by chromatography on 1 lb. of acid-washed alumina, using ether-petroleum ether as eluent, gives ethyl α-(1-p-chlorobenzyl-2-phenyl-5-methoxy-3-indolyl)-acetate.

The ester is saponified with 1 N sodium hydroxide in 90% ethanol at reflux temperature for 2 hours to give α - (1 - p - chlorobenzyl-2-phenyl-5-methoxy-3-indolyl)-acetic acid.

*Example 33.—α-(1-p-methylthiobenzyl-2-methyl-5-methoxy-3-indolyl)-propionic acid*

215 ml. of dry dimethyl formamide is chilled to 0° C. under nitrogen. 2.08 g. of 52.7% sodium hydride in mineral oil (.0456 m.) is added all at once and stirred for 20 minutes at 0–5° C. Then 11.2 g. (.043 m.) of ethyl α - (2-methyl-5-methoxy-3-indolyl) - propionate is added and stirred for 20 minutes at 0–5° C. A solution of 7.8 g. (.0453 m.) of p-methylthiobenzyl chloride in 15 ml. of dimethylformamide is added dropwise over a period of 40 minutes at 0–6° C. The reaction mixture is allowed to come to room temperature gradually with stirring for 6 hours, then allowed to stand overnight at room temperature. The reaction mixture is poured into 300 g. of ice and 300 ml. of water. The precipitated gum is extracted with 3 x 200 ml. of ether. The combined extracts are washed with 5 x 150 ml. of water, dried over magnesium sulfate, and the ether removed in vacuo. The residual yellow oil shows no N—H bond in its I.R. spectrum. The oil is dissolved in 250 ml. of ethanol; a solution of 20 ml. of 34% NaOH and 20 ml. of water is added and the mixture refluxed with stirring under $N_2$ for 2 hours. The reaction mixture is concentrated in vacuo to about 100 ml. and diluted with 215 ml. of water. The cloudy solution is extracted with 2 x 86 ml. of ether. The clear aqueous solution is held under vacuum to remove any dissolved ether, then chilled to 10° C. and acidified by adding 90 ml. of 2.5 N HCl over ½ hour keeping the temperature at 10–15° C. with cooling. The precipitated gummy crystals are filtered off and dissolved in about 150 ml. of benzene. The filtrate is extracted with 50 ml. of benzene. The combined benzene solution and extracts are washed with 25 ml. of water, dried over magnesium sulfate and concentrated in vacuo to about 50 ml. 100 ml. of petroleum ether is added cautiously and the precipitated gum crystallized by scratching and stirring. After stirring for 1 hour, the crystals of α-(1-p-methylthiobenzyl-2-methyl-5-methoxy-3-indolyl)-propionic acid are collected, washed with 3 x 10 ml. of petroleum ether, and air dried at room temperature, M.P. 151–154° C. 13.5 g. of this material is dissolved in 80 ml. of boiling ethanol, treated with decolorizing charcoal, filtered hot, and washed with a little hot ethanol. After chilling at 0–5° for 1 hour, the crystals are collected, washed with 3 x 3 ml. of cold ethanol, and air dried at 50° C., M.P. 170–173° C.

*Example 34.—α-(1-p-mercaptobenzyl-2-methyl-5-methoxy-3-indolyl)-propionic acid*

To a vigorously stirred solution of 152 g. of potassium hydroxide in 1250 ml. of ethanol is added cautiously 176 g. of carbon disulfide. The addition rate should be such that the temperature remains below the boiling point of carbon disulfide. The resulting potassium ethyl xanthate is collected by suction filtration and washed with ether.

25 g. of p-aminobenzyl alcohol is dissolved in 200 ml. of water containing 80 ml. of concentrated hydrochloric acid at 10° C. The solution is cooled to 2° C. and a solution of 15.5 g. of sodium nitrite in 40 ml. of water is added, keeping the temperature between 0–5° C., until a positive test to starch iodide paper is obtained. The red diazonium solution is then neutralized to Hydrion paper by addition of solid potassium acetate. The cold neutral diazonium solution is filtered into a beaker containing 97.6 g. of potassium ethyl xanthate in 1000 ml. of water at 75–80° C. Upon addition of the diazonium solution, vigorous evolution of nitrogen occurs. The reaction mixture is heated 1 hour on the steam bath. The reaction mixture is cooled to 25° C. and the deep red oil extracted into four 250-ml. portions of ether. The combined ether extracts are washed with three 250-ml. portions of water, dried and evaporated. The red oily residue is added to a solution of 33 g. of potassium hydroxide in 300 ml. of ethanol and the mixture refluxed for 2 hours under nitrogen. Then 50.6 g. of benzyl chloride is added and the mixture refluxed for 3 more hours under nitrogen. The reaction mixture is filtered by suction to remove potassium chloride and the filtrate evaporated to dryness in vacuo. The residue is dissolved in 2 l. of ether and the solution washed with four 250-ml. portions of water. The ether layer is separated, dried and evaporated in vacuo. The brown semi-solid material is crystallized first from 200 ml. of benzene and then from 1750 ml. of cyclohexane to give p-benzylmercaptobenzyl alcohol, M.P. 75–81° C.

10.7 g. of p-benzylmercaptobenzyl alcohol is dissolved in 100 ml. of thionyl chloride at 0° C. and the reaction mixture allowed to stand 1 hour with stirring. The thionyl chloride is removed in vacuo and the red oily residue dissolved in 500 ml. of benzene. The benzene solution is washed with two 250-ml. portions of water, 250 ml. of 10% potassium bicarbonate solution and finally with two 250-ml. portions of water. The benzene layer is separated, dried and evaporated in vacuo to give crude material. Crystallization from 100 ml. of ethanol yields p-benzylmercaptobenzyl chloride, M.P. 91–93° C.

A solution of 6.5 g. of ethyl α-(2-methyl-5-methoxy-3-indolyl)-propionate in 50 ml. of dry dimethylformamide is added dropwise to an ice-cold stirred suspension prepared from 1.3 g. of 53% sodium hydride-mineral oil emulsion and 16 ml. of dry dimethylformamide in an atmosphere of nitrogen. The ice bath is removed and the reaction mixture stirred for 30 minutes at room temperature. The flask is again cooled to 0° C. and 6.1 g. of p-benzylmercaptobenzyl chloride in 40 ml. of dry dimethylformamide added in one portion. The flask is flushed with nitrogen, stoppered and allowed to stand with stirring at room temperature overnight. The solvent is removed in vacuo. The oily residue is dissolved in 200 ml. of ether and the solution washed with two 100-ml. portions of hydrochloric acid, two 100-ml. portions of 2% sodium hydroxide and finally with two 100-ml. portions of water. The ether layer is dried over magnesium sulfate and evaporated in vacuo. The infrared spectrum of the resulting orange oil shows N—H at $2.95\mu$ whose intensity was 8% that of the carbonyl band at $5.78\mu$, indicating almost complete alkylation. The orange oil is dissolved in 50 ml. of ethanol containing 20 ml. of 30% aqueous sodium hydroxide solution and refluxed for 3 hours. The ethanol is then removed in vacuo and the residue dissolved in 200 ml. of water. The basic aqueous solution is washed with two 100-ml. portions of ether, acidified with concentrated hydrochloric acid and the product extracted into 400 ml. of ether. The ether extract is washed with four 100-ml. portions of water, dried and the ether evaporated in vacuo. The residue is dissolved in 140 ml. of hot carbon tetrachloride and allowed to stand in the cold for 48 hours. At the end of this time the crystalline α-[1-(p-benzylmercaptobenzyl)-2-methyl-5-methoxy-5-indolyl]-propionic acid is collected by suction filtration, washed with cold carbon tetrachloride and dried in vacuo over phosphorus pentoxide, M.P. 150–153° C.

6 g. of the above compound is suspended in 150 ml. of liquid ammonia. The flask is cooled in a Dry Ice bath and small pieces of sodium metal are added with swirling until the blue color persists for 45 minutes. 1.3 g. of sodium metal is required. After the addition of 4.5 g. of ammonium chloride to decompose excess sodium metal, the ammonia is evaporated in a stream of nitrogen. The white solid residue is dissolved in 250 ml. of water and 3 ml. of 10% sodium hydroxide is added. The basic aqueous solution is washed with two 100-ml. portions of ether, acidified with concentrated hydrochloric acid and the product extracted into 300 ml. of ether. The ether extract is washed with two 100-ml. portions of water, dried and the ether removed in vacuo. The white crystalline α-[1-(p-mercaptobenzyl)-2-methyl-5-methoxy-3-indolyl]-propionic acid is pumped for 16 hours at 0.1 mm. pressure to remove final traces of solvent, M.P. 161–164° C.

When methyl - (2 - methyl - 5 - methoxy - 3 - indolyl)-acetate is employed as starting material in the processes of Examples 33 and 34 in the place of ethyl α-(2-methyl-5-methoxy-3-indolyl)-propionate, there is obtained α-(1-p - methylthiobenzyl - 2 - methyl - 5 - methoxy - 3 - indolyl)-acetic acid and α-(1-p-mercaptobenzyl-2-methyl-5-methoxy-3-indolyl)-acetic acid.

*Example 35.—α-(1-p-methylsulfinylbenzyl-2-methyl-5-methoxy-3-indolyl)-propionic acid*

A. 10 g. (0.025 m.) of ethyl α-(1-p-methylthiobenzyl-2-methyl-5-methoxy-3-indolyl)-propionate is dissolved in ethyl ether and cooled to −20 to −25° C. 138 ml. of mono-perphthalic acid in ether (0.178 ml.) is added dropwise over a period of 30 minutes. The mixture is stirred for 1 hour in a Dry Ice bath and then held in an ice bath for 20 hours. The ether solution is decanted through glass wool and concentrated to dryness in vacuo. The residue is dissolved in 200 ml. of chloroform, filtered and the filtrate dried over sodium sulfate. The solution is filtered and then concentrated in vacuo to a slurry. The slurry is poured onto a 300 g. alumina column. The column is washed with 20% ether in petroleum ether to remove starting material. Elution of the column with 5% methanol in ether removes ethyl α-(1-p-methylsulfenylbenzyl - 2 - methyl - 5 - methoxy - 3 - indolyl)-propionate. Elution with 10% methanol in ether yields ethyl α - (1 - p - methylsulfinylbenzyl - 2 - methyl - 5 - methoxy-3-indolyl)- propionate. Each of these compounds is hydrolyzed to the free acid as described below.

B. 2.73 g. (0.0063 m.) of ethyl α-(1-p-methylsulfenylbenzyl - 2-methyl - 5 - methoxy - 3 - indolyl) - propionate is added to 30 ml. of ethanol containing 3 ml. of 34% sodium hydroxide, and the solution allowed to stand at room temperature for 14 hours. This solution is then poured into water, washed with two 25-ml. portions of ether, and acidified with 2.5 N hydrochloric acid. The solid which forms is filtered off and recrystallized from ethyl acetate-ethanol-petroleum ether to give substantially pure α - (1 - p - methyl - sulfenylbenzyl - 2 - methyl - 5-methoxy-3-indolyl)-propionic acid, M.P. 194–196° C.

Calcd. for $C_{21}H_{23}O_5NS$: C, 62.84; H, 5.73; N, 3.49. Found: C, 62.67; H, 5.75; N, 3.39.

C. 2.78 g. (0.0067 m.) of ethyl α-(1-p-methylsulfinylbenzyl - 2 - methyl - 5 - methoxy - 3 - indolyl) - propionate is placed in 30 ml. of ethanol containing 3 ml. of 34% sodium hydroxide and allowed to stand at room temperature for 14 hours. This solution is then poured into water, washed with two 25-ml. portions of ether, and then acidified with 2.5 N hydrochloric acid. A brown gum forms which is extracted with chloroform and the extract dried over sodium sulfate. After filtration and concentration of this chloroform solution, the resulting gum is crystallized from ethyl acetate-ethanol-petroleum ether. The solid α-(1-p-methylsulfinylbenzyl-2-methyl-5-methoxy-3-indolyl)-propionic acid thus obtained melts at 98–101° C.

Calcd. for $C_{21}H_{23}O_4NS$: C, 65.45; H, 5.97; N, 3.63. Found: C, 64.82; H, 6.03; N, 2.89.

*Example 36.—1-p-methylmercaptobenzyl-2-trifluoromethyl-5-methoxy-3-indolyl acetic acid*

A mixture of 17.0 g. of 5,5,5-trifluoro levulinic acid, prepared according to the procedure reported by P. Brown et al. in Tetrahedron, 10, 164 (1960), and 28.0 g. of $N_1$ - (p - methylmercaptobenzyl)-p-methoxyphenylhydrazine hydrochloride in 200 ml. of acetic acid is heated at 40° C. for 1 hour and then at 90° C. for 3 hours. The reaction mixture is poured into iced water and the product is extracted with 3 x 300 ml. of ether. The ether extract is washed with 1 N hydrochloric acid, water and dried over sodium sulfate. Evaporation of the solution and chromatography of the syrupy residue on a silica gel column using mixtures of 10–50% ether in petroleum ether as solvent yields 1-p-methylmercaptobenzyl-2-trifluoromethyl-5-methoxy-3-indolyl acetic acid, which is recrystallized from benzene, M.P. 168–172° C.

*Example 37.—1-p-methylthiobenzyl-2-methyl-5-methoxy-3-indolyl acetic acid*

A. 250 ml. of dry dimethylformamide and 2.88 g. (0.057 m.) of 51% sodium hydride-mineral oil suspension are stirred in a salt-ice bath for 20 minutes. 12.58 g. (0.054 m.) of methyl 2-methyl-5-methoxy-3-indolyl acetate is added and the mixture stirred for 20 minutes. 10 g. of p-methylthiobenzyl chloride in 25 ml. of dimethylformamide is added over a period of 5 minutes and stirring continued for about 14 hours as the reaction mixture warms to room temperature. The reaction mixture is poured onto ice and water. A gum forms which is dissolved in ether. The ether solution is washed with four 300-ml. portions of water, dried over sodium sulfate, filtered and concentrated to a syrup of methyl-(1-p-methylthiobenzyl - 2 - methyl-5-methoxy-3-indolyl)-acetate weighing 15 g.

B. 15 g. (0.042 m.) of the syrup of methyl-(1-p-methylmercaptobenzyl - 2 - methyl-5-methoxy-3-indolyl)-acetate in 270 ml. of ethanol containing 15 ml. of concentrated sodium hydroxide and 15 ml. of water is refluxed on a steam bath for 3 hours, then allowed to stand for 14 hours at room temperature. The solution is then concentrated in vacuo to remove ethanol, diluted with 150 ml. of water, washed with two 100-ml. portions of ether, and acidified with 2.5 N hydrochloric acid. A yellow gum forms which is crystallized from ether. On recrystallization from hot ethanol, substantially pure 1 - p-methylthiobenzyl-2-methyl-5-methoxy-3-indolyl acetic acid is obtained, M.P. 155–156.5° C.

C. The free acid so obtained may be converted to esters in the following manner:

25 g. of 1-p-methylthiobenzyl-2-methyl-5-methoxy-3-indolyl acetic acid and 480 ml. of 1.6 N ethanolic hydrogen chloride are refluxed under nitrogen for 2 hours. This red solution is added to 1500 ml. of ice and water and extracted with two 250-ml. portions of ether and one 250-ml. portion of benzene. The organic solutions are combined and washed with one 250-ml. portion of water, three 150-ml. portions of saturated sodium bicarbonate solution, and one 250-ml. portion of water. The organic layer is dried over sodium sulfate, filtered, concentrated and scratched to crystallize. The crystalline ethyl ester thus obtained is collected and recrystallized from hot ethanol to give pure material, M.P. 94–95° C.

*Example 38.—α - (1 - p-methylthiobenzyl-2,5-dimethyl-3-indolyl)-propionic acid*

500 ml. of dry dimethylformamide and 6.0 g. (0.12 m.) of sodium hydride is stirred in an ice bath under nitrogen for 20 minutes. 24.5 g. (0.10 m.) of ethyl α-(2,5-dimethyl-3-indolyl)-propionate is added and the entire mixture stirred for 20 minutes. 21.04 g. (0.12 m.) of p-methylthiobenzyl chloride in 20 ml. of dry dimethylformamide is added slowly and stirring is continued for 2 hours. The reaction mixture is then poured into ice and water; a gum forms which crystallizes when ether is added. The solid ethyl α-(1-p-methylthiobenzyl-2,5-dimethyl-3-indolyl)-propionate is recrystallized from ethanol to give substantially pure material, M.P. 111–113° C.

20 g. (0.052 m.) of ethyl α-(1-p-methylthiobenzyl-2,5-dimethyl-3-indolyl)-propionate, 20 ml. of 34% sodium hydroxide and 180 ml. of ethanol are refluxed on the steam bath under nitrogen for 2 hours. The solution is then concentrated on the steam bath in vacuo to remove ethanol, poured into 200 ml. of water, and washed with two 50-ml. portions of ether. The aqueous layer is acidified with 2.5 N hydrochloric acid. The resulting solid is filtered off and recrystallized from ethylene dichloride. 9.6 g. of α-(1-p-methylthiobenzyl-2,5-dimethyl-3-indolyl)-propionic acid is obtained, M.P. 184–187° C.

*Example 39.—α - (1-p-trifluoromethylbenzyl-2-methyl-5-methoxy-3-indolyl)-propionic acid*

To a mixture of 7.29 g. of magnesium shavings in 50 ml. of dry ether is added 10 ml. of a solution of 61 g. of p-trifluoromethylbromobenzene in 60 ml. of ether. The mixture is stirred under nitrogen with occasional warming. After a few minutes 2 ml. of freshly prepared methyl magnesium iodide solution in ether is added. Formation of the Grignard reagent of p-trifluoromethyl bromobenzene eventually begins with a mild exothermic reaction and color formation.

To the reaction mixture is then added 200 ml. of ether followed by the remaining p-trifluoromethyl bromobenzene in ether over a period of 1 hour. The mixture is heated under reflux for 1½ hours until only trace of Mg metal remains. The solution is cooled to 5° C. in an ice bath and 81 g. of N-methylformanilide added dropwise over 20 minutes. The mixture is stirred in the ice bath for another 2 hours and at room temperature for 18 hours. With ice-cooling the resulting solution is treated with 200 ml. of 5 N sulfuric acid with stirring for ½ hour, and stirring is continued at room temperature for another ½ hour. The ether layer is then separated and the aqueous layer extracted with 2 x 100 ml. of ether. The combined ether solutions are washed with 100 ml. of 3 N sulfuric acid and 3 x 100 ml. of water, and dried over sodium sulfate. The ethereal solution is evaporated to dryness and the residue distilled at B.P. 64° C. (12 mm.), $N_D^{22}$ 1.4633 to yield p-trifluoromethylbenzaldehyde.

To a solution of 20.9 g. of p-trifluoromethylbenzaldehyde in 100 ml. of methanol is added 2.5 g. of sodium borohydride with ice-cooling and stirring. After 2 hours in an ice bath and ½ hour at room temperature the solution is treated with excess of 0.5 N sodium hydroxide and extracted with 3 x 100 ml. of ether. The ethereal solution is dried over sodium sulfate, filtered and concentrated to a syrup. Fractionation of the syrup gives p-trifluoromethylbenzyl alcohol, B.P. 85–88° C. (12 mm.), $N_D^{22}$ 1.4562.

To a solution of 13 g. of p-trifluoromethylbenzyl alcohol in 100 ml. of benzene is added 14 g. of thionyl chloride in 20 ml. of benzene with stirring and ice-cooling over a period of 15 minutes. The solution is stirred in an ice bath for 2 hours, at room temperature for 18 hours and finally refluxed for ½ hour. The cooled solution is poured into iced water and extracted with 3 x 100 ml. of ether. The ether extract is washed with sodium bicarbonate solution, water and dried over sodium sulfate. Distillation of the product gives p-trifluoromethylbenzyl chloride, B.P. 68° C. (12 mm.), $N_D^{22}$ 1.4622.

To a suspension of 2.5 g. of 51% sodium hydride-mineral oil suspension in 250 ml. of dry dimethylformamide is added 12 g. of ethyl α-(2-methyl-5-methoxy-3-indolyl)-propionate with stirring and cooling. After 30 minutes 10 g. of p-trifluoromethylbenzyl bromide is added dropwise from a dropping funnel. The mixture is stirred while it is allowed to come to room temperature. It is held for 15 hours in the cold and then poured into water. The aqueous mixture is extracted with ether. The ether layer is separated, washed with water, dried over sodium sulfate, filtered, and concentrated to a syrup.

The syrup is added to 300 ml. of ethanol containing 30 ml. of concentrated sodium hydroxide, and the mixture refluxed on a steam bath for 2 hours. The solution is concentrated to remove ethanol, and diluted with water. The aqueous layer is washed twice with ether and acidified with 2.5 N hydrochloric acid. α-(1-p-trifluoromethylbenzyl-2-methyl-5-methoxy-3-indolyl)-propionate precipitates. It is removed by filtration and recrystallized from ethanol and then from ethyl acetate-petroleum ether to give substantially pure material, M.P. 176–180° C.

*Example 40.—α-(1-p-cyanobenzyl-2-methyl-5-methoxy-3-indolyl)-propionic acid*

Equimolar amounts of ethyl α-(2-methyl-5-methoxy-3-indolyl)-propionate, sodium hydride and p-cyanobenzyl bromide are reacted in a dimethylformamide medium as described in Example 15. After chromatography on alumina as there described there is obtained ethyl α-(1-p-cyanobenzyl-2-methyl-5-methoxy-3-indolyl)-propionate, M.P. 72° C. after recrystallization from ethanol.

2.5 g. of this ester is treated at room temperature for 18 hours with 12 ml. of 2.5 N sodium hydroxide in 300 ml. of ethanol. The reaction mixture is then treated with water, concentrated, extracted with ether and acidified as described in Example 16 to give a mixture of α-(1-p-cyanobenzyl-2-methyl-5-methoxy-3-indolyl)-propionic acid and the 1-p-carbamylbenzyl and 1-p-carboxybenzyl derivatives. The desired p-cyanobenzyl compound is obtained by removing the ether, extracting the residue with benzene and recrystallizing from ethyl acetate-petroleum ether, M.P. 197–200° C.

*Example 41.—α-(1-p-carboxybenzyl-2-methyl-5-methoxy-3-indolyl)-propionic acid*

A solution of 2 g. of ethyl α-(1-p-cyanobenzyl-2-methyl-5-methoxy-3-indolyl)-propionate and 25 ml. of 30% sodium hydroxide in 150 ml. of ethanol is heated at reflux temperature for 18 hours. The solution is then concentrated to about ½ volume in vacuo, diluted with 300 ml. of water and extracted with 300 ml of ether. The aqueous layer is acidified with dilute hydrochloric acid to precipitate the product which is extracted with benzene to remove impurities and then recrystallized from acetic acid or aqueous ethanol to give α-(1-p-carboxybenzyl - 2 - methyl - 5 - methoxy - 3 - indolyl) - propionic acid, M.P. 230–234° C.

*Example 42.—α-(1-p-nitrobenzyl-2-methyl-5-methoxy-3-indolyl)-propionic acid*

A. A mixture of 44 g. of p-methoxyphenylhydrazine hydrochloride, 42 g. of p-nitrobenzyl chloride and 70 ml. of triethylamine in 500 ml. of ethanol is refluxed for 6 hours. After cooling, 80 ml. of 3.2 N hydrogen chloride in ethanol is added and the mixture is concentrated to a small volume and partitioned between ether and water. The crystalline $N_1$-(p-nitrobenzyl)-p-methoxyphenylhydrazine hydrochloride which separates is collected and dried, M.P. 147–150° C. (14.4 g.).

B. A solution of 14.4 g. of the above hydrazine hydrochloride and 7.1 g. of ethyl α-methyl levulinate in 100 ml. of 3.2 N ethanolic hydrogen chloride is refluxed for 2½ hours. The solution is then diluted with water and the product is isolated by ether extraction. The crude syrupy ethyl (1-p-nitrobenzyl-2-methyl-5-methoxy-3-indolyl)-α-propionate obtained on removal of the ether is purified by chromatography (as in Example 1) on an alumina column to yield the propionate ester as bright yellow needles, M.P. 102–103° C., on recrystallization from ethanol.

C. A mixture of 2 g. of the above ester, 4.80 g. of potassium carbonate, 80 ml. of water and 160 ml. of acetone is refluxed for 8 hours. The solution is cooled, diluted with water, concentrated and filtered to remove unchanged ester. The filtrate is acidified with dilute hydrochloric acid to precipitate α-(1-p-nitrobenzyl-2-methyl-5-methoxy-3-indolyl)-propionic acid, which is then purified by crystallization from aqueous ethanol, M.P. 188–190° C.

*Example 43.—α-(1-p-dimethylaminobenzyl-2-methyl-5-methoxy-3-indolyl)-propionic acid*

A solution of 2.85 g. of ethyl α-(1-p-nitrobenzyl-2-methyl-5-methoxy-3-indolyl)-propionate, 2.4 ml. of 37% formaldehyde and 5 ml. of acetic acid in 60 ml. of ethanol is hydrogenated at 45–50° C. in the presence of a Raney nickel catalyst. After the theoretical quantity of hydrogen is consumed the hydrogenation is stopped. The solution is filtered, concentrated in vacuo to about 30 ml., poured into 100 ml. of iced dilute sodium hydroxide and extracted with 3 x 125 ml. of ether. Evaporation of the ether solution yields ethyl α-(1-p-dimethylaminobenzyl-2-methyl-5-methoxy-3-indolyl)-propionate.

2.3 g. of this ester is saponified by treatment with 62 ml. of 0.5 N sodium hydroxide in ethanol at room temperature under nitrogen. 18 ml. of ethanol is then added and the solution adjusted to pH 5–6 with concentrated hydrochloric acid. Cautious addition of water precipitates α - (1 - p - dimethylaminobenzyl - 2 - methyl-5-methoxy-3-indolyl)-propionic acid, M.P. 193–194° C., on recrystallization from methanol.

Treatment of the above acid with hydrogen peroxide at −10 to 0° C. gives the corresponding N-oxide of the indolyl propionic acid.

Example 44.—α-(1-p-acetamidobenzyl-2-methyl-5-methoxy-3-indolyl)-propionic acid A solution of 4.25 g. of ethyl α-(1-p-nitrobenzyl-2-methyl-5-methoxy-3-indolyl)-propionate in a mixture of 100 ml. of acetic anhydride and 100 ml. of acetic acid is reductively acetylated in the presence of 1 g. of palladium on charcoal catalyst. The solution is then filtered, poured into 200 ml. of iced water and extracted with 400 ml. of chloroform. Evaporation of the chloroform solution gives ethyl α-(1-p-acetamidobenzyl-2-methyl-5-methoxy-3-indolyl)-propionate as a syrup which may be purified by chromatography on activated alumina.

Treatment of the above ester with potassium carbonate in aqueous acetone at reflux temperature for 6 hours gives α-(1-p-acetamidobenzyl-2-methyl-5-methoxy-3-indolyl)-propionic acid.

Example 45.—α-[1-p-(N,N-dimethylaminosulfonyl)-benzyl-2-methyl-5-methoxy-3-indolyl]-propionic acid A. A mixture of 59.7 g. of N,N-dimethyl-p-toluenesulfonamide and 53.4 g. of N-bromosuccinimide in 500 ml. of carbon tetrachloride is heated under reflux for 2½ hours until only a trace of N-bromosuccinimide remains. The solution is filtered, washed with water and with sodium bicarbonate, and dried over sodium sulfate. It is then filtered and evaporated to a syrupy residue which is triturated with Skellysolve B to give crystalline N,N-dimethyl-p-bromomethylbenzenesulfonamide, M.P. 85–108° C. The product is used directly for the following experiment.

B. Reaction of 22.2 g. of ethyl α-(2-methyl-5-methoxy-3-indolyl)-propionate with the above bromide in the presence of 4 g. of 50% sodium hydride-mineral oil emulsion in 450 ml. of dimethylformamide, as described in Example 15, gives, after the alumina chromatography, ethyl α-[1-p-(N,N-dimethylaminosulfonyl)-benzyl-2-methyl-5-methoxy-3-indolyl]-propionate, M.P. 140° C., on recrystallization from ethanol.

A solution of 5.5 g. of the above ester and 10 ml. of 34% sodium hydroxide in 250 ml. of ethanol is refluxed under nitrogen for 4 hours. The acidic product is isolated as in Example 16 and recrystallized from ethyl acetate and petroleum ether to give substantially pure α-[1-p-(N,N-dimethylaminosulfonyl)-benzyl-2-methyl-5-methoxy-3-indolyl]-propionic acid, M.P. 156.5–158.5° C.

Example 46.—α-(1-p-ethylthiobenzyl-2-methyl-5-methoxy-3-indolyl)-propionic acid A. 178 ml. (1.35 m.) of diethylsulfate is added dropwise during a period of 1 hour to a vigorously stirred solution of 148.5 g. of thiophenol in 1.1 liters of 10% sodium hydroxide at 8–10° C. The reaction mixture is stirred at 25° C. for 1 hour. The two phases of the reaction mixture are now separated in a separatory funnel and the aqueous phase extracted with 500 ml. of ethyl ether. The ether extract is combined with the organic phase and the combined solution washed with 200 ml. of 2½% sodium hydroxide and four 200-ml. portions of water. The ether solution is then dried over anhydrous magnesium sulfate. The drying agent is removed by filtration and the ether boiled off on a steam cone. Final traces of ether are removed in vacuo to yield 177 g. of thiophenetol as an oil.

B. In a flask equipped with a condensor protected by a drying tube is placed 177 g. of thiophenetol, 82 ml. of chloromethyl methylether, and 770 ml. of glacial acetic acid. The resulting solution is heated at 75° C. for 48 hours. The reaction mixture is then poured into 1 liter of ice water and the product extracted with two 800-ml. portions of ether. The ether extracts are combined and washed with 1 liter of potassium bicarbonate solution followed by two 1-liter portions of water. The ether layer is separated and dried over anhydrous magnesium sulfate. The drying agent is removed by filtration and the ether boiled off on a steam cone to yield a red brown clear oil. The oil is distilled in vacuo. The fraction distilling at 92–102° C./250–400 mμ is collected and used in the next step of the process. It is predominantly p-ethylthiobenzyl chloride.

C. A solution of 13.0 g. of ethyl α-(2-methyl-5-methoxy-3-indolyl)-propionate in 45 ml. of dry dimethylformamide is added dropwise to a stirred suspension of 2.45 g. of sodium hydride in 45 ml. of dimethylformamide cooled to 0° C. with an ice methanol bath. The reaction mixture is stirred at 0° C. for 20 minutes under nitrogen. 10.1 g. (8.8 ml.) of the p-ethylthiobenzyl chloride obtained above is added in one portion and the reaction mixture allowed to stand with stirring for 15 hours. It is then poured into ice water and the product extracted into ether. The ether extract is washed with potassium bicarbonate solution followed by a water wash. The ether extract is dried over anhydrous magnesium sulfate, the drying agent removed by filtration and the ether solution concentrated in vacuo to give ethyl α-(1-p-ethylthiobenzyl-2-methyl-5-methoxy-3-indolyl)-propionate.

D. A solution of 18 g. of ethyl α-(1-p-ethylthiobenzyl-2-methyl-5-methoxy-3-indolyl)-propionate, 40 ml. of 30% sodium hydroxide and 240 ml. of absolute ethanol is refluxed for 2 hours. The ethanol is then evaporated in vacuo, and the residue dissolved in 300 ml. of water. The aqueous solution is extracted with 250 ml. of ether, the layers separated and the aqueous phase acidified to pH 1 with concentrated hydrochloric acid. An oil precipitates which soon crystallizes and is kept at 0° C. for 30 minutes. The crystals are filtered, washed with water and recrystallized from 25 ml. of absolute ethanol-2% benzene. The crystals of α-(1-p-ethylthiobenzyl-2-methyl-5-methoxy-2-indolyl)-propionic acid are collected by filtration, washed with cold ethanol and dried in vacuo at 22° C., M.P. 126–133° C.

Example 47.—α-(1-p-phenylthiobenzyl-2-methyl-5-methoxy-3-indolyl)-propionic acid A. 100 g. of diphenylsulfide, 36.3 ml. of chloromethyl methyl ether and 340 ml. of glacial acetic acid are placed in a flask equipped with a condenser protected by a drying tube. The resulting solution is heated with stirring at 73° C. for 48 hours. The solution is cooled and poured into two liters of ether. The ether solution is washed with 1 liter of ice water, 500 ml. of ice water containing 25 g. of potassium bicarbonate, and finally with 500 ml. of distilled water. The ether layer is separated and dried over anhydrous magnesium sulfate. The drying agent is filtered off and the ether removed in vacuo to yield 108 g. of a clear yellow oil. 35 g. of the oil is distilled in vacuo to give 32 g. of distillate, B.P. 85–145° C./50μ. This distillate is 39% (by analysis) phenylthiobenzyl chloride.

B. A solution of 13.0 g. (0.05 m.) of ethyl α-(2-methyl-5-methoxy-3-indolyl)-propionate in 45 ml. of dry dimethylformamide is added dropwise to a stirred suspension of 2.45 g. (0.055 m.) of sodium hydride (50% in mineral oil) in 45 ml. of dimethylformamide at 0° C. in a nitrogen atmosphere. The reaction mixture is stirred for ½ hour at 0° C. and then 32 g. of 39% phenylthiobenzyl chloride is added dropwise. The reaction mixture is stirred overnight at room temperature, and then heated at 70° C. for 3 hours. The mixture is then poured into 500 ml. of ice water. The product is extracted with four 500-ml. portions of ether. The ether extracts are combined, washed with water, potassium bicarbonate solution, and again with water. The ether layer is separated and dried over anhydrous sodium sulfate. The drying agent is removed and the ether removed in vacuo to yield 42.5 g. of a dark red oil consisting substantially of ethyl α-(1-p-phenylthiobenzyl-2-methyl-5-methoxy-3-indolyl)-propionate.

C. A solution of 40 g. of ethyl α-(1-p-phenylmercaptobenzyl-2-methyl-5-methoxy-3-indolyl)-propionate, prepared above, 40 ml. of 30% sodium hydroxide and 500 ml. of absolute ethanol are refluxed for 2 hours. The ethanol is removed in vacuo and the residue dissolved in 350 ml. of water. The aqueous solution is extracted with two 400-ml. portions of ether. The two phases are separated and the aqueous phase acidified to pH 1 with concentrated hydrochloric acid. The resulting crystalline product is filtered, washed with water and recrystallized from 200 ml. of absolute ethanol to give substantially pure α-(1-p-phenylthiobenzyl-2-methyl-5-methoxy-3-indolyl)-propionic acid.

*Example 48*

4.45 g. of α-(1-p-methylthiobenzyl-2-methyl-5-methoxy-3-indolyl)-propionic acid is slurried in 12 ml. of methanol and the system purged with nitrogen. 5.2 ml. of 2.21 N sodium methoxide in methanol is then added under a nitrogen atmosphere. The mixture is stirred for a few minutes and then the clear solution is concentrated to a thick syrup. 90 ml. of ethyl ether are added slowly with stirring to cause crystallization of the sodium salt of α-(1-p-methylthiobenzyl-2-methyl-5-methoxy-3-indolyl)-propionic acid. The resulting slurry is stirred for 1 hour under nitrogen and then the crystals of sodium salt are collected by filtration. They are washed with three 5-ml. portions of ether and air dried. The resulting white powder has the following absorption in the ultraviolet: $A_{.311}=123$; $A_{.299}=194$; $A_{.280}=278$; $A_{.259}=440$.

7.4 g. of α-(1-p-methylthiobenzyl-2-methyl-5-methoxy-3-indolyl)-propionic acid are added to 50 ml. of water which has been flushed with nitrogen. The slurry is stirred under nitrogen and 20 ml. of 1.05 N sodium hydroxide added with stirring. When a clear solution is obtained, a solution of 2.2 g. of $Al_2(SO_4)_3 \cdot 18H_2O$ in 8 ml. of water is added with vigorous stirring. The mixture is stirred until it is homogenous and the solid aluminum salt of α-(1-p-methylthiobenzyl-2-methyl-5-methoxy-3-indolyl)-propionic acid recovered by filtration and washed with water and with ethanol. After drying in vacuo at room temperature, it has the following ultraviolet absorptions: $A_{.315}=83$; $A_{.300}=193$; $A_{.280}=280$; $A_{.260}=441$.

In a similar fashion, there may be prepared the sodium and aluminum salts as well as other salts, such as the potassium, iron and magnesium salts, of the various 1-(functionally substituted benzyl)-indolyl aliphatic acids described in the accompanying examples.

*Example 49.—α-(1-p-chlorobenzyl-2-methyl-5-methoxy-3-indolyl)-acrylic acid*

A. 500 ml. of dry ether, 36.02 g. of methyl triphenylphosphonium bromide and 94.36 ml. of 1.10 N n-butyl lithium are stirred for 1 hour at room temperature under nitrogen. 38 g. of ethyl α-(1-p-chlorobenzyl-2-methyl-5-methoxy-3-indolyl)-keto acetate in 260 ml. of benzene and 500 ml. of dry ether are added, and stirring continued for 1 hour. The reaction mixture is transferred to a pressure flask and heated in a closed flask at 65–70° C. for 5 hours. The liquid is poured from the pressure flask and the gum triturated with 500 ml. of 33% benzene in ether. The solutions are combined and washed with three 500-ml. portions of water, dried over sodium sulfate, filtered and concentrated in vacuo to a syrup. The syrup is slurried in benzene and charged onto a 200 g. column of activated alumina. Ethyl α-(1-p-chlorobenzyl-2-methyl-5-methoxy-3-indolyl)-acrylate is eluted by washing the column with 30% ether in petroleum ether and removing the eluting solvents by concentration. After recrystallization from hot petroleum ether, the ester melts at 94–95° C.

70 mg. of ethyl α-(1-p-chlorobenzyl-2-methyl-5-methoxy-3-indolyl)-acrylate and 2 ml. of ethanol containing 0.2 ml. of sodium hydroxide are refluxed under nitrogen for 1 hour. 3 ml. of water are added and the solution concentrated in vacuo. 7 ml. of water is added to the concentrate which is then washed with two 5-ml. portions of ether and acidified with 2.5 N hydrochloric acid. The resulting precipitate is recrystallized from ethanol to give substantially pure α-(1-p-chlorobenzyl-2-methyl-5-methoxy-3-indolyl)-acrylic acid, M.P. 187–188° C.

B. The starting material for the above experiment is prepared in the following manner:

19 g. of oxalyl chloride in 25 ml. of ether is added rapidly to an ice cold mixture of 35.7 g. of 1-p-chlorobenzyl-2-methyl-5-methoxy indole in 900 ml. of ether. The resulting mixture is stirred for 2 hours and the resulting solid recovered by filtration and washed with cold ether. The solid material is then added to 660 ml. of ethanol and to the resulting solution is added with stirring 0.12 m. of sodium ethoxide. The resulting mixture is stirred for 1 hour and then poured into an equal volume of water containing about 10 ml. of acetic acid. The solid material is removed by filtration, washed with sodium bicarbonate and water and then dried. It is recrystallized from benzene-petroleum ether to give ethyl α-(1-p-chlorobenzyl-2-methyl-5-methoxy-3-indolyl)-keto acetate, M.P. 113° C.

*Example 50.—α-(1-p-chlorobenzyl-2-methyl-5-methoxy-3-indolyl)-cyclopropyl carboxylic acid*

1.8 g. of ethyl α-(1-p-chlorobenzyl-2-methyl-5-methoxy-3-indolyl)-acrylate in 10 ml. of dry tetrahydrofuran is added to 4 g. of diiodomethane, 1.25 g. of zinc-copper couple and 0.2 g. of iodine in 20 ml. of dry tetrahydrofuran. The mixture is refluxed under nitrogen with stirring for 20 hours. The reaction mixture is then filtered, the filtrate added to ice water, and the whole extracted with three 50-ml. portions of ether. The combined ether extracts are washed with two 50-ml. portions of water, dried over sodium sulfate, filtered, and concentrated. The syrup thus obtained is poured onto a 60 g. alumina column as a slurry in benzene. 1.2 g. of ethyl α-(1-p-chlorobenzyl-2-methyl-5-methoxy-3-indolyl)-cyclopropyl carboxylate is collected from the column by elution, with 60% ether-petroleum ether, and is hydrolyzed to the free acid without further purification.

640 mg. of ethyl α-(1-p-chlorobenzyl-2-methyl-5-methoxy-3-indolyl)-cyclopropyl carboxylate and 20 ml. of 1 N ethanolic sodium hydroxide are refluxed for 2 hours and then poured into ice and water. The aqueous solution is washed with two 50-ml. portions of ether and acidified with 2.5 N hydrochloric acid. The resulting precipitate of α-(1-p-chlorobenzyl-2-methyl-5-methoxy-3-indolyl)-cyclopropyl carboxylic acid is collected by filtration, washed with water and dried in vacuo. On purification, it melts at 220–224° C.

*Example 51.—1-p-methylmercaptobenzyl-5-methoxy-3-indolyl acetic acid*

A solution of 0.12 m. of $N_1$-(p-methylthiobenzyl)-p-methoxyphenylhydrazine hydrochloride and 0.1 m. of ethyl γ-formylpropionate in 300 ml. of acetic acid is heated under nitrogen at 50° C. for ½ hour and then at 90° C. for ½ hour. The reaction mixture is poured into 1 liter of water and the product extracted with 3 x 500 ml. of ether. The ether solution is washed with dilute hydrochloric acid, sodium bicarbonate and dried over sodium sulfate. Evaporation of the solution and chromatography of the syrupy residue on 400 g. of alumina, using mixtures of ether and petroleum ether (1:20–1:2) as eluent, gives ethyl-(1-p-methylthiobenzyl-5-methoxy-3-indolyl)-acetate.

This ester is saponified with 150 ml. of 1 N sodium hydroxide in 90% aqueous ethanol at room temperature for 18 hours. The acidic product is recovered and purified as described in Example 3.

When $N_1$-(p-chlorobenzyl-p-methoxyphenylhydrazine is treated with ethyl γ-formylpropionate in the above manner, and the resulting ester saponified with ethanolic sodium hydroxide, there is produced α-(1-p-chlorobenzyl-5-methoxy-3-indolyl)-acetic acid, M.P. 146–148° C.

*Example 52.—α-(1-p-chlorobenzyl-2-benzyl-5-methoxy-3-indolyl)-propionic acid*

0.12 m. of $N_1$-(p-chlorobenzyl)-p-methoxyphenylhydrazine hydrochloride and 0.1 m. of ethyl-2-methyl-4-oxo- 5-phenyl valerate are reacted together in 300 ml. of 2 N ethanolic hydrogen chloride for 2 hours at the reflux temperature. The reaction mixture is then concentrated to about ⅓ volume and diluted with 3 volumes of water. The aqueous solution is extracted with 3 volumes of ether, the ether extracts concentrated to dryness and the residual material chromatographed on a column of activated aluminum as described in Example 8 above. Ethyl α - (1 - p - chlorobenzyl - 2 - benzyl - 5 - methoxy - 3 - indolyl)-propionate is eluted with ether-petroleum ether and converted to the free acid by refluxing in 1 N ethanolic sodium hydroxide. The resulting acid is purified by recrystallization from ethanol.

*Example 53.—α-(1-o,p-dimethoxybenzyl-2-methyl-5-methoxy-3-indolyl)-propionic acid*

N-(o,p-dimethoxybenzyl)-p-methoxyaniline is prepared by reacting together 37 g. of p-methoxyaniline and 50 g. of 2,4-dimethoxybenzaldehyde in 250 ml. of ethanol in the presence of Raney nickel catalyst at a positive hydrogen pressure of 40 p.s.i. After recrystallization from ether-ethanol the product melts at 126–127° C.

The compound obtained immediately above is converted to N-nitroso-N-(o,p-dimethoxybenzyl)-p-methoxyaniline by treatment with sodium nitrite and this latter compound reduced with aluminum amalgam as described in Example 27 to yield $N_1$-(o,p-dimethoxybenzyl)-p-methoxyphenylhydrazine hydrochloride, M.P. 136–139° C.

A solution of 0.12 m. of this latter compound in 200 ml. of acetic acid is reacted with 0.1 m. of ethyl α-methyl levulinate. The reaction mixture is heated at 90–95° C. for 1 hour and the resulting ethyl α-(1-o,p-dimethoxybenzyl-2-methyl-5-methoxy-3-indolyl)-propionate purified by alumina chromatography as described in Example 1. The ethyl ester is converted to the free acid by the procedure of Example 3.

*Example 54.—α-[1-α-(p-methylthiophenyl)-ethyl-2-methyl-5-methoxy-3-indolyl]-propionic acid*

5 g. of ethyl α-(2-methyl-5-methoxy-3-indolyl)-propionate is converted to its sodium salt by the method described in Example 8 and the resulting salt reacted with 6 g. of p-methylthio-α-phenethyl chloride following the procedure of Example 8. The ester thus obtained is converted to α-[1-α-(p-methylthiophenyl)-ethyl-2-methyl-5-methoxy-3-indolyl]-propionic acid by hydrolysis with aqueous alcoholic sodium hydroxide via the procedure of Example 8.

In a similar fashion, 5.2 g. of ethyl α-(2-methyl-5-methoxy-3-indolyl)-propionate and 3.7 g. of 2-methyl-4-methylthiobenzyl chloride are reacted to form, after hydrolysis of the ethyl ester, α-(1-o-methyl-p-methylthiobenzyl-2-methyl-5-methoxy-3-indolyl)-propionic acid.

*Example 55*

A. 24.9 g. of racemic α - (1 - p - methylthiobenzyl - 2 - methyl-5-methoxy-3-indolyl)-propionic acid and 9.5 g. of (+)-α-phenethylamine are dissolved in 350 ml. of boiling ethanol. The solution is then cooled to 20–25° C., and allowed to stand for 90 minutes. The crystalline material which forms is recovered by filtration, washed with cold ethanol and with ether. It is recrystallized from ethanol to give substantially pure (+)-α-(1-p-methylthiobenzyl - 2 - methyl - 5 - methoxy - 3 - indolyl) - propionic acid (+)-α-phenethylamine salt, M.P. 170–172° C., $[\alpha]_D^{22}+38.5°$ (c.=1, methanol).

This product is added at room temperature to a mixture of 100 ml. of ether, 50 ml. of water and 2.5 ml. of concentrated hydrochloric acid. After a few minutes the ether layer is separated, and the aqueous acidic solution extracted with 2 x 75 ml. of ether. The combined ether extracts are concentrated to dryness in vacuo. The residue thus obtained is recrystallized from 20 ml. of ether and 12 ml. of benzene to give substantially pure (+) - α - (1 - p - methylthiobenzyl - 2 - methyl - 5 - methoxy - 3 - indolyl) - propionic acid, M.P. 118° C., $[\alpha]_D^{22}+62.4°$ (c.=0.94, ethanol).

(−) - α - (1 - p - methylthiobenzyl - 2 - methyl - 5 - methoxy - 3 - indolyl) - propionic acid is obtained from a racemic mixture by the method described above employing (−)-α-phenethylamine as the resolving agent.

B. A mixture of 10 g. of racemic α-(1-p-chlorobenzyl-2-methyl-5-methoxy-3-indolyl)-propionic acid and 4 g. of (+)-α-phenethylamine is dissolved in 100 ml. of hot isopropanol. The solution is allowed to cool slowly whereupon 2.5 g. of (+)-α-(1-p-cholorobenzyl-2-methyl-5-methoxy-3-indolyl)-propionic acid (+)-α-phenethylamine salt crystallizes. This salt is removed by filtration, washed with isopropanol and with ether, and dried. On further cooling of the filtrate, an additional 3.0 g. of salt crystallizes. On recrystallization from isopropanol the salt has M.P. 148–149° C., $[\alpha]_D^{22}+43°$ (c.=1, methanol).

To a suspension of this salt in a mixture of water and ethyl ether is added an excess of dilute hydrochloric acid. The acidified mixture (pH 2) is shaken and the solvent layers allowed to separate. The ether phase is removed, washed with water and dried over sodium sulfate and magnesium sulfate. The ether is then removed by evaporation in vacuo and the residue crystallized from aqueous ethanol to give (+)-α-(1-p-chlorobenzyl - 2 - methyl - 5-methoxy-3-indolyl)-propionic acid. On recrystallization from benzene-petroleum ether (1:1) the product has M.P. 156–157° C., $[\alpha]_D^{22}+60°$ (c.=1, ethanol).

The isopropanol filtrate which is rich in (−)-α-(1-p-chlorobenzyl - 2 - methyl - 5 - methoxy - 3 - indolyl)-propionic acid (+)-α-phenethylamine salt is concentrated to dryness in vacuo and the residue treated with dilute hydrochloric acid in a water-ether mixture in the manner described above. The ether solution thus obtained is concentrated to dryness in vacuo and dissolved in hot acetonitrile. This solution, upon cooling, deposits crystals of DL - α - (1-p-chlorobenzyl-2-methyl-5-methoxy-3-indolyl) - propionic acid. The acetonitrile filtrate is concentrated to dryness and the residue thus obtained crystallized from aqueous ethanol to give (−)-α-(1-p-chlorobenzyl - 2 - methyl-5-methoxy-3-indolyl)-propionic acid which on recrystallization from benzene-petroleum ether has a melting point of 153–154° C., $[\alpha]_D^{23}−58°$ (c.=1, ethanol).

When the above experiment is carried out using (−)-phenethylamine as the resolving agent instead of (+)-phenethylamine, the (−)-α-(1-p-chlorobenzyl-2-methyl-5 - methoxy - 3-indolyl)-propionic acid (−)-α-phenethylamine salt is more insoluble of the two diastereoisomers and crystallizes from the isopropanol reaction medium.

C. The racemic forms of the other α-(1-functionally substituted benzyl-2-methyl-5-methoxy or 5-methyl-3-indolyl)-propionic acids described herein, such as α-(1-p-fluorobenzyl - 2 - methyl - 5 - methoxy - 3 - indolyl)-propionic acid, α - (1-p-methoxybenzyl-2-methyl-5-methoxy-3-indolyl)-propionic acid and α-(1-p-methylthiobenzyl - 2,5 - dimethyl-3-indolyl)-propionic acid, are resolved in a similar fashion into their (+) and (−) enantiomorphs employing an optically active form of phenethylamine as the resolving agent.

*Example 56.—α-(1-p-methylthiobenzyl-2-methyl-5-methoxy-3-indolyl)-propionamide*

8.8 g. (0.023 m.) of α-(1-p-methylthiobenzyl-2-methyl-5-methoxy-3-indolyl)-propionic acid and 14 g. (0.023 m.) of urea are heated at 190–200° C. for 1½ hours. The reaction mixture is then cooled to 140° C. and 15 ml. of dry dimethylformamide is added. The solution is cooled to room temperature and 150 ml. of water added. The aqueous mixture is extracted with two 150-ml. portions of chloroform. The chloroform extracts are combined and washed with two 100-ml. portions of water, two 100-ml. portions of 1.2 N hydrochloric acid, one 200-ml. portion of sodium bicarbonate, and one 200-ml. portion of water. The chloroform solution is dried over sodium sulfate, filtered, and concentrated to a syrup. This syrup is put on a 200 gm. column of alumina and the amide washed off with 5% methanol in ether. The solid is recrystallized from benzene-petroleum ether to give α - (1 - p - methylthiobenzyl - 2-methyl-5-methoxy-3-indolyl)-propionamide, M.P. 143–144° C.

When the above process is carried out employing α-(1-p - methylthiobenzyl - 2 - methyl - 5 - methoxy - 3-indolyl)-acetic acid or α-(1-p-chlorobenzyl-2,5-dimethyl-3-indolyl)-propionic acid as starting material, there is obtained respectively α-(1-p-methylthiobenzyl-2-methyl-5-methoxy-3-indolyl)-acetamide and α-(1-p-chlorobenzyl-2,5-dimethyl-3-indolyl)-propionamide. The other carboxylic acids described herein are converted to the corresponding amides in similar fashion.

*Example 57*

A. *(1 - p - chlorobenzyl - 2 - carboxyl - 5 - methoxy-3-indolyl)-acetic acid.*—A solution of 0.05 m. of $N_1$-(p-chlorobenzyl)-p - methoxyphenylhydrazine hydrochloride and 0.05 m. of γ-keto-glutaric acid in 150 ml. of acetic acid is heated on a steam bath for 1¼ hours under nitrogen. The cooled solution is poured into 1 liter of ice water and the precipitate collected, washed with water, dried and recrystallized from aqueous dimethylformamide, M.P. 213–218° C.

B. *(1-p-chlorobenzyl-2-carboxyl-5-methoxy-3-indolyl)-acetic acid anhydride.*—The acid obtained above is heated in 150 ml. of acetic anhydride at the reflux temperature for 2 hours. On cooling (1-p-chlorobenzyl-2-carboxyl-5-methoxy-3-indolyl)-acetic acid anhydride crystallizes and is collected by filtration, M.P. 205–211° C.

C. *Ethyl-(1-p-chlorobenzyl - 2 - carboxyl-5-methoxy-3-indolyl)-acetate.*—The anhydride obtained above is dissolved in 200 ml. of absolute ethanol at 0° C. and one equivalent of sodium ethoxide in ethanol is added dropwise at 0° C. with stirring. After stirring at room temperature for 1 hour the solution is poured into 1 liter of ice water containing a slight excess of dilute hydrochloric acid and the product is collected by filtration and recrystallized from aqueous methanol, M.P. 214–216° C.

D. *Ethyl - (1-p-chlorobenzyl-2-chlorocarbonyl-5-methoxy-3-indolyl)-acetate.*—To a solution of the above ester (0.05 m.) in 200 ml. of benzene is added dropwise a solution of 0.06 m. of thionyl chloride in 20 ml. of benzene with ice-cooling and stirring. The mixture is stirred at 0° C. for 2 hours and at room temperature for 4 hours. The solution is evaporated in vacuo to give the corresponding acid chloride.

E. *Ethyl - (1 - p - chlorobenzyl-2-formyl-5-methoxy-3-indolyl)-acetate.*—To a solution of 0.02 m. of the above acid chloride in 100 ml. of dry tetrahydrofuran is added dropwise a solution of lithium tri-(tertiary-butoxy) aluminum hydride in tetrahydrofuran with ice-cooling and stirring. After 2 hours at 0° C. and 2 hours at room temperature, the mixture is treated with a slight excess of ethanol and then poured into 500 ml. of ice water. The product is extracted with 3 x 300 ml. of ether, washed with sodium bicarbonate and dried over sodium sulfate. Evaporation and chromatography of the residue on alumina using mixtures of 10–50% ether-petroleum ether as eluent gives the aldehyde, which is purified by recrystallization from benzene-petroleum ether.

F. *(1-p-chlorobenzyl - 2 - hydroxymethyl-5-methoxy-3-indolyl)-acetic acid.*—To a solution of 0.02 m. of the above aldehyde in 200 ml. of ethanol is added 0.02 m. of sodium borohydride in 20 ml. of ethanol with ice-cooling and stirring. After 1 hour in the ice bath and 4 hours at room temperature, the solution is poured into 1 liter of water containing a slight excess of dilute hydrochloric acid and extracted with 3 x 300 ml. of ether. The ether solution is washed with sodium bicarbonate and dried over sodium sulfate. Evaporation of the solution and purification of the residue by chromatography on a silica gel column using 10–50% ether in petroleum ether as eluent yields the lactone of (1-p-chlorobenzyl-2-hydroxymethyl-5-methoxy-3-indolyl)-acetic acid.

Treatment of the lactone (0.01 m.) with 0.01 m. of sodium hydroxide in 50 ml. of 90% aqueous ethanol at room temperature for 18 hours, followed by dilution with 300 ml. of ether, affords the sodium salt of (1-p-chlorobenzyl-2-hydroxymethyl-5-methoxy-3-indolyl)-acetic acid.

G. *(1-p-chlorobenzyl-2-benzylthiomethyl-5-methoxy-3-indolyl)-acetic acid.*—A solution of 0.02 m. of the above lactone and 0.025 m. of potassium benzylmercaptide in 300 ml. of ethanol is heated under reflux for 18 hours under nitrogen. The solution is concentrated in vacuo to a volume of about 100 ml. and then poured into 500 ml. of ice water containing 0.03 m. of hydrochloric acid. The oily product is extracted with 2 x 200 ml. of methylene chloride, the extracts washed with water and dried over sodium sulfate. The solution is filtered, evaporated and charged on a 1 lb. silica gel column. Elution with 10% ether in petroleum ether removes some unchanged benzylmercaptan. (1-p-chlorobenzyl-2-benzylthiomethyl-5-methoxy-3-indolyl)-acetic acid is recovered from the column with 50–100% ether in petroleum ether. It is recrystallized from ethanol.

*Example 58.—(1-p-chlorobenzyl-5-methoxy-3-indolyl)-acetic acid*

5 g. of the compound of Example 57C is heated under nitrogen at 225° C. for 80 minutes. The product is then dissolved in ether and the ether solution washed with dilute sodium carbonate. The sodium carbonate is removed by filtration and the ether dried over sodium sulfate and evaporated in vacuo to a syrup comprising ethyl-(1-p-chlorobenzyl - 5 - methoxy-3-indolyl)-acetate. This ester is saponified with aqueous ethanolic sodium hydroxide as described in Example 16 to form (1-p-chlorobenzyl-5-methoxy-3-indolyl)-acetic acid which, after recrystallization from a mixture of acetonitrile and benzene, melts at 146–148° C.

*Example 59.—α-(1-p-methylthiobenzyl-5-methoxy-2,3-dihydro-3-indolyl)-acetic acid*

3 g. of ethyl-(5-methoxy-3-indolyl)-acetate is treated with hydrogen at a pressure of 40 p.s.i. and in the presence of Raney nickel catalyst until a molar quantity of hydrogen is absorbed. The catalyst is then removed by filtration and the resulting ethyl-(5-methoxy-2,3-dihydro-3-indolyl)-acetate recovered by methods known in the art. This product is treated with p-methylthiobenzyl chloride, and the resulting ester hydrolyzed as described in Example 37 to give (1-p-methylthiobenzyl-5-methoxy-2,3-dihydro-3-indolyl)-acetic acid.

*Example 60*

In addition to the method described in Example 29, the p-methylthiobenzyl chloride utilized as starting material in some of the foregoing examples may be prepared in the following manner:

24 g. of methylmercaptan is bubbled into 350 ml. of ethanol containing 32.5 g. of 86.5% potassium hydroxide. 1.2 ml. of water is then added, followed by addition of a solution of 70.3 g. of p-chlorobenzaldehyde in 150 ml. of ethanol. The solution is refluxed for 3 hours while methylmercaptan is slowly bubbled into it. It is then poured into 500 ml. of water. The yellow oil which forms is separated and the aqueous layer extracted with 4 x 50 ml. of ethylene dichloride. The oil and the ethylene dichloride extracts are combined and washed with water until neutral. The ethylene dichloride is then distilled in vacuo and the residual oil concentrated to constant weight to give substantially pure p-methylthiobenzaldehyde.

A mixture of 20 g. of p-methylthiobenzaldehyde, 8 g. of aluminum isopropoxide and 300 ml. of isopropanol is heated for 3½ hours and the solvent distilled at the rate of about 25 ml./hour. The mixture is then concentrated to a volume of about 30 ml. and cooled to 5° C. It is treated at 5–10° C. with a solution of 12 ml. of concentrated hydrochloric acid in 90 ml. of water. The resulting acidified solution is extracted with 4 x 50 ml. of ether and the ether extracts combined, washed with water and dried over sodium sulfate. The ether is removed in vacuo to give a residual oil of p-methylthiobenzyl alcohol, which crystallizes on standing.

19.5 g. of this alcohol in 25 ml. of benzene is cooled to 10° C. and a solution of 23 g. of thionyl chloride in 14 ml. of benzene added thereto at 10–15° C. over a period of 60 minutes. The resulting mixture is stirred at room temperature for 3 hours and then concentrated to dryness in vacuo under nitrogen at a temperature of 40–50° C. The residue is washed with 50 ml. of benzene and then concentrated in vacuo to constant weight to give substantially pure p-methylthiobenzyl chloride.

It is to be appreciated that the α-(1-functionally substituted benzyl-3-indolyl)-lower aliphatic acids of this invention vary in the degree of physiological activity which they possess, and certain of them represent preferred aspects of our discovery. Among the preferred compounds are those wherein $R_2$ in Formula I is a lower alkyl radical such as methyl or ethyl and $R_3$ is hydrogen or methyl. Also preferred are those products having a functional substituent in the para position of the benzyl radical ($R_5$) and a lower alkyl or lower alkoxy radical in the 5-position of the indole nucleus ($R_4$). Of these, α-(1-p-halobenzyl - 2 - methyl - 5-loweralkyl-3-indolyl)-propionic acid, α-(1-p-halobenzyl - 2 - methyl-5-loweralkoxy - 3 - indolyl)-propionic acid, α-(1-p-loweralkoxybenzyl-2-methyl-5-loweralkyl-3-indolyl) - propionic acid, α-(1-p-loweralkoxybenzyl - 2 - methyl - 5 - loweralkoxy-3-indolyl)-propionic acid, α-(1-p-methylthiobenzyl-2-methyl-5-methoxy-3-indolyl)-propionic acid and α-(1-p-methylthiobenzyl-2-methyl-5-loweralkyl-3-indolyl) - propionic acid, and the non-toxic salts of such acids, represent preferred aspects of the invention with respect to use as anti-inflammatory agents.

When the compounds of the invention are to be employed for treatment of the disease conditions previously referred to, they may be formulated into unit dosage forms such as tablets or capsules. For instance, tablets containing 100 mg. of the sodium salt of α-(1-p-methylthiobenzyl-2-methyl-5-methoxy - 3 - indolyl)-propionate and having the following composition per tablet:

| | Mg. |
|---|---|
| Sodium-α-(1 - p-methylthiobenzyl - 2 - methyl - 5-methoxy-3-indolyl)-propionate | 100 |
| Lactose | 90 |
| Corn starch | 14 |
| Starch-paste | 10 |
| Magnesium stearate | 1 |
| | 215 | are prepared by mixing the sodium salt, lactose and 10 mg. of corn starch and grinding to a fine powder. This mixture is granulated with the starch paste and the wet mass passed through a #10 screen. It is dried at 110-120° F. for about 12 hours and passed through a #20 mesh screen. Then 4 mg. of corn starch and 1 mg. of magnesium stearate are added to the resulting unmixed granulation, and the whole compressed into tablets.

Although the optimum quantities of α-(1-p-functionally substituted benzyl-3-indolyl)-lower aliphatic acid, or salt, ester or amide derivative thereof, to be used in the management of arthritic and other inflammatory conditions will depend on the compound employed and the particular type of disease condition being treated, oral dose levels of the preferred compounds in the range of about 150–2000 mg. per day are useful in management and control of arthritic conditions.

Any departure from the above description which conforms to the present invention is intended to be included within the scope of the claims.

We claim:
1. A compound of the formula—

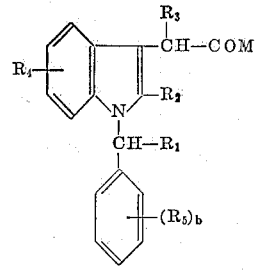

in which
$R_1$ is selected from the group consisting of hydrogen, lower alkyl and lower alkenyl,
$R_2$ is selected from the group consisting of hydrogen, lower alkyl, cyclo-lower alkyl, lower alkenyl, phenyl, benzyl, phenethyl, halogen-lower akyl, hydroxy lower alkyl, halogenated phenyl, lower alkoxyphenyl, carboxyl, carboxy chloride and formyl,
$R_3$ is selected from the group consisting of hydrogen, lower alkyl, lower alkylidenyl and cyclopropyl with the elimination of the hydrogen on the carbon to which $R_3$ is attached,
$R_4$ is selected from the group consisting of cyano, carboxy and carb-lower alkoxy, and is on a carbon one carbon removed from the points of fusion of the heterocyclic ring,
$R_5$ is selected from the group consisting of hydroxy, lower alkoxy, monocyclic six-membered carbocyclic aryloxy, monocyclic six-membered carbocyclic ar-lower alkoxy, halogenated monocyclic six-membered carbocyclic ar-lower alkoxy, lower alkoxy monocyclic six-membered carbocyclic ar-lower alkoxy, halogen, halogeno lower alkyl, lower alkanoyl, halogeno lower alkanoyl, monocyclic six-membered carbocyclic aryl lower alkanoyl, halogeno lower alkoxy and benzylthio methyl,
$b$ is a positive whole number less than four and
$M$ is selected from the group consisting of OH, $NH_2$, lower alkoxy, benzyloxy and OZ in which Z is a cation selected from the group consisting of alkali metals, alkaline earth metals, ammonium, lower alkyl amino, cholinium, pyridinium, morpholinium, glucosammonium, di(lower alkyl)amine, zinc, iron and aluminum.

2. A compound of the formula—

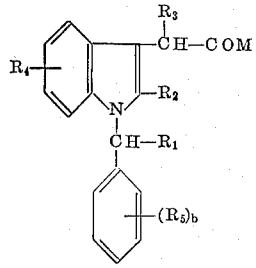

in which
$R_1$ is selected from the group consisting of hydrogen, lower alkyl and lower alkenyl,
$R_2$ is selected from the group consisting of hydrogen, lower alkyl, cyclo-lower alkyl, lower alkenyl, phenyl, benzyl, phenethyl, halogeno-lower alkyl, hydroxy lower alkyl, halogenated phenyl, lower alkoxyphenyl, carboxyl, carboxy chloride and formyl,
$R_3$ is selected from the group consisting of hydrogen, lower alkyl, lower alkylidenyl and cyclopropyl with the elimination of the hydrogen on the carbon to which $R_3$ is attached,
$R_4$ is selected from the group consisting of cyano, carboxy and carb-lower alkoxy, and is on a carbon one carbon removed from the points of fusion of the heterocyclic ring, $R_5$ is selected from the group consisting of nitro, amino, lower alkanoylamino, monocyclic six-membered carbocyclic aroylamino, lower alkylamino, di-(lower alkyl)-amino, lower alkanoylamidino and hydrazino, $b$ is a positive whole number less than four and M is selected from the group consisting of OH, $NH_2$, lower alkoxy, benzyloxy and OZ in which Z is a cation selected from the group consisting of alkali metals, alkaline earth metals, ammonium, lower alkyl amino, cholinium, pyridinium, morpholinium, glucosammonium, di(lower alkyl)amine, zinc, iron and aluminum.

3. A compound of the formula—

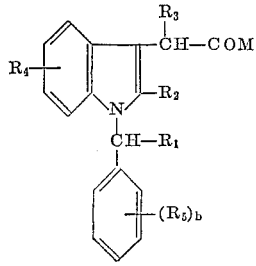

in which $R_1$ is selected from the group consisting of hydrogen, lower alkyl and lower alkenyl, $R_2$ is selected from the group consisting of hydrogen, lower alkyl, cyclo-lower alkyl, lower alkenyl, phenyl, benzyl, phenethyl, halogeno-lower alkyl, hydroxy lower alkyl, halogenated phenyl, lower alkoxyphenyl, carboxyl, carboxy chloride and formyl, $R_3$ is selected from the group consisting of hydrogen, lower alkyl, lower alkylidenyl and cyclopropyl with the elimination of the hydrogen on the carbon to which $R_3$ is attached, $R_4$ is selected from the group consisting of cyano, carboxy and carb-lower alkoxy, and is on a carbon one carbon removed from the points of fusion of the heterocyclic ring, $R_5$ is selected from the group consisting of mercapto, lower alkylthio, monocyclic six-membered carbocyclic arylthio, monocyclic six-membered carbocyclic ar-lower-alkylthio, halogeno lower alkylthio, sulfamoyl and di-(lower alkyl)-sulfamoyl, $b$ is a positive whole number less than four and M is selected from the group consisting of OH, $NH_2$, lower alkoxy, benzyloxy and OZ in which Z is a cation selected from the group consisting of alkali metals, alkaline earth metals, ammonium, lower alkyl amino, cholinium, pyridinium, morpholinium, glucosammonium, di(lower alkyl)amine, zinc, iron and aluminum.

References Cited by the Examiner
UNITED STATES PATENTS
2,890,223   6/1959   Woolley et al. _____ 260—319

NICHOLAS S. RIZZO, *Primary Examiner.*

HENRY R. JILES, *Examiner.*